(12) United States Patent
Kuppig et al.

(10) Patent No.: US 8,957,958 B2
(45) Date of Patent: Feb. 17, 2015

(54) MICROSCOPE SYSTEM, MICROSCOPY METHOD AND STORAGE MEDIUM

(75) Inventors: Stephan Kuppig, Jena (DE); Thomas Kalkbrenner, Jena (DE); Ingo Kleppe, Jena (DE); Yauheni Novikau, Jena (DE)

(73) Assignee: Carl Zeiss Microscopy GmbH (DE)

( * ) Notice: Subject to any disclaimer, the term of this patent is extended or adjusted under 35 U.S.C. 154(b) by 732 days.

(21) Appl. No.: 13/249,409

(22) Filed: Sep. 30, 2011

(65) Prior Publication Data
US 2012/0081536 A1 Apr. 5, 2012

(30) Foreign Application Priority Data
Sep. 30, 2010 (DE) .......................... 10 2010 041 794

(51) Int. Cl.
H04N 7/18 (2006.01)
G02B 21/36 (2006.01)
G06K 9/00 (2006.01)

(52) U.S. Cl.
CPC .................................. *G02B 21/367* (2013.01)
USPC ............................................ 348/79; 382/128

(58) Field of Classification Search
USPC ............................................ 348/79; 382/133
See application file for complete search history.

(56) References Cited

U.S. PATENT DOCUMENTS

| 7,006,675 B2 * | 2/2006 | Olschewski | 382/128 |
| 2003/0011674 A1 * | 1/2003 | Olschewski | 348/80 |
| 2006/0239534 A1 | 10/2006 | Sumida et al. | |
| 2006/0291040 A1 * | 12/2006 | Ganser | 359/368 |
| 2009/0244698 A1 * | 10/2009 | Zust | 359/368 |
| 2010/0054574 A1 * | 3/2010 | Marcelpoil et al. | 382/133 |
| 2011/0216953 A1 * | 9/2011 | Callahan et al. | 382/128 |

FOREIGN PATENT DOCUMENTS

| DE | 10 2006 021 317 | 5/2006 |
| DE | 10 2007 046 469 | 9/2007 |
| DE | 102 06 979 | 2/2009 |

(Continued)

OTHER PUBLICATIONS

L. Schermelleh et al., "A guide to super-resolution fluorescence microscopy", J. Cell Biol. 190(2): 165 (2010).

(Continued)

*Primary Examiner* — Sath V Perungavoor
*Assistant Examiner* — Howard D Brown, Jr.
(74) *Attorney, Agent, or Firm* — Mayback & Hoffman, P.A.; Gregory L. Mayback; Rebecca A. Tie

(57) ABSTRACT

A microscope system comprises a microscope for data acquisition and a computing device configured to control the microscope during data acquisition and/or to perform data processing of raw data captured by the microscope. The computing device is coupled to an optical output device. The microscope and the computing device are configured to perform the data acquisition and/or data processing based on values that are respectively set for each one of a plurality of adjustable parameters. The computing device selectively outputs graphics data via the optical output device as a function of an adjustable parameter selected from the plurality of adjustable parameters. The output graphics data are assigned to the selected adjustable parameter and represent an affect of the selected adjustable parameter on at least one step of a procedure upon which the data acquisition and/or the data processing is based.

17 Claims, 10 Drawing Sheets

(56) References Cited

FOREIGN PATENT DOCUMENTS

| | | |
|---|---|---|
| DE | 10 2009 043 744.4 | 9/2009 |
| DE | 10 2009 060 490.1 | 12/2009 |
| DE | 10 2009 060 793.5 | 12/2009 |
| EP | 1 157 297 | 3/1999 |
| EP | 1 308 715 | 5/2003 |
| EP | 1 341 023 | 9/2003 |
| EP | 1 669 789 | 12/2005 |
| WO | 2006/127692 | 11/2006 |
| WO | 2007/009812 | 1/2007 |

OTHER PUBLICATIONS

Gurskaya et al., Nature Biotech., vol. 24, pp. 461-465, 2006.
D. Oron et al., "Scanningless depth-resolved microscopy", Optics Express 13, 1468 (2005).
Mats G.L. Gustafsson et al., "Doubling the lateral resolution of wide-field fluorescence microscopy using structured illumination", Proceedings of SPIE vol. 3919 (2000).
Russell E. Thompson, Daniel R. Larson, and Watt W. Webb: "Precise Nanometer Localization Analysis for Individual Fluorescent Probes", Biophysical Journal vol. 82 May 2002 2775-2783.
"Strukturierte Beleuchtung in der Hochauflösungsmikroskopie" by Dr. Klaus Weisshart, Dr. Gerhard Krampert, Dr. Yauheni Novikau, and Dr. Michael Kempe. Optik & Photonik, Apr. 2010, Nr. 1.
"Structure brings clarity: Structured illumination microscopy in cell biology" by Matthias F. Longhorst, Joerg Schaffer and Bernhard Goetze. Biotechnology Journal, 2009, 4, 858-865.
"Ultra-High Resolution Imaging by Fluoresence Photoactivation Localization Microscopy" by Samuel T. Hess, Thanu P. K. Girirajan and Michael D. Mason. Biophysical Journal, vol. 91, Dec. 2006, 4258-4272.
"Super-resolution video microscopy of live cells by structure illumination" by Peter Kner, Bryant B. Chhun, Eric R. Griffis, Lukman Winoto & Mats G.L. Gustafsson. Nature Methods, vol. 6, No. 5, May 2009, 339-342.
"Mikroscopie von Carl Zeiss. ApoTome auf einmal sieht alles anders aus."
"Sleuthing the virus . . . Widefield Image Acquisiton and Analysis." BIOforum Europe Apr. 2007, pp. 78-79.
"Mikroscopie von Carl Zeiss. Mikroskopie Aktuell."
"Take Off Guide. AxioVision." Release 4.8 vom Jun. 2009. Anleitung zum Einstieg in die AxioVision Imaging Software.
European Search Report of App. No. 11182904.0-2217.

\* cited by examiner

MICROSCOPE SYSTEM, MICROSCOPY METHOD AND STORAGE MEDIUM

CROSS-REFERENCE TO RELATED APPLICATIONS

This application claims the priority, under 35 U.S.C. §§119 and 371, of German Patent Application No. DE 10 2010 041 794.7, filed Sep. 30, 2010, the entire disclosure of which is hereby incorporated herein by reference in its entirety.

STATEMENT REGARDING FEDERALLY SPONSORED RESEARCH OR DEVELOPMENT

Not Applicable

FIELD OF THE INVENTION

The invention relates to a microscope system, a microscopy method and a storage medium storing computer-executable instruction code for a microscope system. The invention relates in particular to such systems and methods that capture raw data and then computationally process the captured raw data, in a procedure having plural steps.

BACKGROUND OF THE INVENTION

Microscopes have been used for the observation of organic and non-organic materials for a long time and in a multitude of applications. The resolution attainable with light microscopes was diffraction limited throughout a significant portion of that period.

Only recently, techniques were developed that allow high-resolution microscopy to be performed, providing a resolution that is less, or even much less, than the diffraction limit. Examples for such techniques include techniques that employ a structured illumination of the object, or luminescence microscopy methods in which objects may be localized with a high precision. The article by L. Schermelleh et al., "A guide to super-resolution fluorescence microscopy", J. Cell Biol. 190(2): 165 (2010), provides an overview over such techniques. For further illustration, such techniques are also described in patent publications European Patent EP 1 157 297 B1 or German Published Patent Application DE 10 2006 021 317 B3. Using such techniques, it has become possible to localize objects with a precision in the range from a few nanometers to a few tens of nanometers. Methods that allow high-resolution luminescence microscopy to be used for three-dimensional imaging are described in German Published Patent Applications DE 10 2009 043 744.4 entitled "Method and microscope for performing three-dimensional resolution-enhanced microscopy", DE 10 2009 060 490.1 entitled "High-resolution microscope and image splitter arrangement", and DE 10 2009 060 793.5 entitled "High-resolution microscope and method of determining object positions in two or three dimensions", all of which are assigned to the assignee of the subject application.

A characteristic of various microscopy methods that allow a resolution much smaller than the diffraction limit to be attained is that data acquisition and data processing may be complex. In data acquisition, a plurality of individual two-dimensional (2D) frames of the object may be captured, which may be processed to compute resulting image data of the object therefrom. As an illustration, in methods that employ a structured illumination of the object, different orientations of the illumination pattern may be used, and one or plural 2D-frames may be captured for each one of the different orientations. The image of the object is generated by processing the information contained in the various 2D-frames using a computer.

For further illustration, high-resolution luminescence microscopy method may use molecules that are optically switchable or optically activatable. To ensure that, for each captured frame, the molecules that can be detected are not located at too small a distance from each other, only a small fraction of the molecules is switched to a state in which it can be detected for each one of the individual captured 2D-frames. A large number of frames, such as from 10,000 to 20,000 frames, may be required to combine the frames to a representation of the examined object that is essentially complete.

Such high-resolution methods may allow values for adjustable parameters to be set in a user-defined manner in order to further enhance the resolution of the resulting image that is obtained by computationally processing the raw data. For methods that employ a structured illumination, examples for such adjustable parameters include the illumination pattern (e.g., the periodicity of the pattern) or the number of different orientations of the illumination pattern for which frames are captured. For methods using luminescence microscopy, examples for such adjustable parameters include a fitting mask that is used to computationally evaluate a frame for localizing luminescence events or a spectrum and intensity of switching signals. For methods in which frames are captured in different object planes, the adjustable parameter may include the positions of the object planes, measured along the axial direction of the microscope, for example. Further examples of adjustable parameters include the characteristics of filters that are used to filter images in position space or in Fourier space.

Due to the complexity of the procedure upon which the data acquisition and data processing is based, it may be difficult for a user to understand the importance and affect of the various adjustable parameters for the underlying procedure. Understanding such affects would be important for the user in particular at the time at which the user sets the values for the adjustable parameters to carry out an experiment or to process raw data.

The user's understanding of the importance of the various adjustable parameters may be aided, to a certain degree, by methods that illustrate the affect of an adjustable parameter on the resulting image. Such simulation methods may use data that have previously been captured or exemplary data stored in a memory. German Published Patent Application DE 10 2007 046 469 A1 describes an example for such a method. Performing data processing using the values that are presently set for the various adjustable parameters may help the user identify suitable settings for the structure that is being examined at the time. However, no information on the underlying procedure is conveyed thereby. Such information would be particularly valuable to assist a user in understanding the importance and affect of the various adjustable parameters, and to use this understanding when data acquisition and data processing is performed for a new object. Moreover, when a simulation of data processing of captured data is performed using a method as described in German Published Patent Application DE 10 2007 046 469 A1, raw data must first be captured. The results of the simulation only have limited value for planning data acquisition. In particular, in cases in which data acquisition may be performed on a given sample only one time, as may be the case when molecules are optically switched in an irreversible manner in a luminescence microscopy data acquisition, it would be desirable for the user to also have a better understanding of the importance and affect of the various adjustable parameters on data acquisition.

There is a need for a microscope system, a microscopy method, and a storage medium storing computer-executable instruction code that address some of the above shortcomings. There is a need for systems and methods that assist a user in planning data acquisition and/or data processing. There is a need for systems or methods that provide the user with information on the affects that various adjustable parameters have when microscopy is performed, even when the procedure for data acquisition and/or data processing is complex.

Thus, a need exists to overcome the problems with the prior art systems, designs, and processes as discussed above.

SUMMARY OF THE INVENTION

The invention provides a microscope system, a microscopy method, and a storage medium storing computer-executable instruction code that overcome the hereinafore-mentioned disadvantages of the heretofore-known devices and methods of this general type.

According to an embodiment, a microscope system is provided. The microscope system comprises a microscope for data acquisition and a computing device. The microscope comprises at least one controllable component. The computing device is configured to control the at least one controllable component of the microscope during data acquisition and/or to process raw data that are captured and provided by the microscope. The microscope system may be configured such that a procedure that has a plurality of steps is carried out to perform data acquisition and/or data processing. The microscope and the computing device are configured to perform the data acquisition and/or data processing as a function of values that are respectively set for a plurality of adjustable parameters. The microscope system comprises an optical output device. The optical output device is coupled to the computing device. The computing device is configured to selectively output graphics data over the optical output device as a function of an adjustable parameter, which adjustable parameter is selected in a user-defined manner. The graphics data output via the optical output device represent an affect of the selected adjustable parameter on at least one step of the procedure, upon which the data acquisition and/or data processing is based.

Such a microscope system is configured to provide information to a user of the microscope system, which illustrates the operation of the procedure. The user can selectively retrieve information on the affect and influence of various adjustable parameters because the graphics data are selectively output in dependence on the selected adjustable parameter. This makes it easier for the user to control a microscope system that allows a plurality of adjustable parameters to be set.

The computing device may be configured to compute image data from a plurality of frames captured during data acquisition. In this case, graphics data may be output over the optical output device for at least one selectable adjustable parameter, with the output graphics data representing the affect of this adjustable parameter on the procedure carried out for data processing. This aids the user in understanding the algorithms upon which data processing is based.

The microscope system may have an input device that allows a user to set the values for the various adjustable parameters. The computing device may be configured such that graphics data may automatically be output for the one of the adjustable parameters, for which the user presently sets a new value via the input device. Thereby, the user receives information on the one of the adjustable parameters for which the associated value is presently being adjusted.

The computing device may be configured to adjust the graphics data in response to a user input. Thereby, the user may retrieve additional information on the selected adjustable parameter in response to the user input, in an interactive manner.

The computing device may be configured to output the graphics data as a function of a value that is set for the selected adjustable parameter. The graphics data may be adjusted in an adaptive manner when the user adjusts the value set for the selected adjustable parameter. This aids the user in identifying the value for the selected adjustable parameter that is suitable for carrying out a data acquisition or data processing later on in operation of the microscope system.

The computing device may be configured to output the graphics data further in dependence on a value that has been set for another adjustable parameter, which is different from the selected adjustable parameter. This allows interrelations between different adjustable parameters to be taken into account. For illustration, if graphics data illustrate a Fourier space accessible by using a structured illumination pattern, the graphics data may be generated and output both in dependence on a value that is set for a periodicity of the structured illumination pattern and in dependence on another value set for the number of different orientations of the illumination pattern. When either one of the periodicity and the number of different orientations is modified by the user, the graphics data may be adjusted accordingly.

The computing device may be configured to output graphics data for at least one of the selectable adjustable parameters before a data acquisition or data processing is performed. Thereby, the graphics data may be used by the user before the data acquisition or data processing is successively carried out.

The graphics data may be generated such that they convey different types of information to the user. In one implementation, the computing device may be configured to generate the graphics data such that they represent an affect of the selected adjustable parameter on the speed and/or resolution and/or sensitivity that can be attained when data acquisition and/or data processing are carried out. Such information may be used when planning an experiment. Alternatively or additionally, the graphics data may include information on the data processing procedure or information on which steps of a procedure for data acquisition or data processing are influenced by the selected adjustable parameter. The graphics data may include graphics information illustrating the affect of a filter or a fitting mask in data processing. The graphics data may include information illustrating the affect of an illumination pattern for a structured illumination. The graphics data may include information that illustrates the affect of an exposure time or power density of an optical switching signal for a method that uses optically switchable or optically activatable molecules. There are various example for such procedures, including the so-called "photo activated localization microscopy" (PALM) techniques. The graphics data may include information on a demixing of data acquisition channels.

When raw data have already been acquired at the time at which the graphics data are generated and output, further graphical information may be output in addition to the graphics data that is associated with the selected adjustable parameter. The further graphical information may be generated as a function of the raw data captured in the data acquisition. In another implementation, the captured raw data may be combined with or otherwise integrated into the graphics data.

The microscope system may be configured to capture data using a structured illumination. The microscope system may include a device for generating an illumination pattern. The device for generating the illumination pattern may be configured such that the orientation of the illumination pattern may be altered. At least one of the adjustable parameters that can be selected for outputting associated graphics data may be included in a group that comprises: a periodicity of an illumination pattern; a count of different orientations of the illumination pattern; and a filter function used for filtering acquired raw data.

The microscope system may be configured to perform microscopy using optically activatable or optically switchable molecules. For illustration, the microscope system may be configured to perform a PALM-technique. The microscope system may include a source for a switching signal. The microscope system may include a source for an optical switching signal. At least one of the adjustable parameters that can be selected for outputting associated graphics data may be included in a group that comprises: a mask size used in fitting for localizing a molecule; a spectrum of a switching signal; and an intensity of a switching signal. For illustration, the graphics data may show the size of the fitting mask in relation to captured raw data. The graphics data may additionally or alternatively represent how the spectrum or intensity of the switching signal influences transition probabilities between different states of color pigments or dye. The graphics data may include a Jablonski diagram to represent this information.

The microscope system may be configured for performing a microscopy using optically activatable or optically switchable molecules. The microscope system may include a source for a switching signal. The microscope system may further be configured to perform data acquisition for a plurality of object planes, the object planes being spaced from each other. The microscope may include a component for adjusting a position of the object planes. The component for adjusting the position of the object planes may include an adjustable lens or an adjustable configuration of micro-lenses. Alternatively or additionally, the component for adjusting the position of the object planes may include an image splitter device. The image splitter device may guide different components of the detected light over different paths, which have adjustable optical path lengths, with the different optical paths being controlled to adjust the position of the object planes. The computing device may be configured to generate the graphics data in dependence on the positions that have been set for the object planes. The graphics data may be generated such that they illustrate how the positions of the object planes influence a size of a measurement area and/or a resolution that can be attained in an axial direction of a beam path.

According to another embodiment, a microscopy method is provided. In the method, data acquisition is performed to capture raw data. Data processing is subsequently performed to computationally process the captured raw data. Data acquisition and/or data processing are performed as a function of values that have been set for a plurality of adjustable parameters. Data acquisition and data processing may be performed according to a procedure that includes a plurality of steps. Graphics data are selectively output over an optical output device. The graphics data are selected in dependence on an adjustable parameter that is selected from the plurality of adjustable parameters in a user-defined manner. The graphics data are associated with the selected adjustable parameter. The graphics data represent an affect of the selected adjustable parameter on at least one step of the procedure, upon which data acquisition and/or data processing is based.

Various implementations of the microscopy method may be used, as explained in the context of the microscope system.

The microscopy method may be performed using the microscope system according to any one embodiment described herein.

According to another embodiment of the invention, a non-transitory storage medium storing a computer program is provided. The computer program includes a sequence of computer-executable instructions. When the series of instructions is carried out by a computing device of a microscope system, the instructions direct the microscope system to perform the method of any one embodiment described herein.

Systems and methods according to embodiments may be used for complex microscopy methods. In particular, systems and methods according to embodiments may be used for microscopy methods where a plurality of frames is first captured and subsequently processed to computationally determine image data.

Although the invention is illustrated and described herein as embodied in a microscope system, a microscopy method, and a storage medium storing computer-executable instruction code, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

Figure 1:
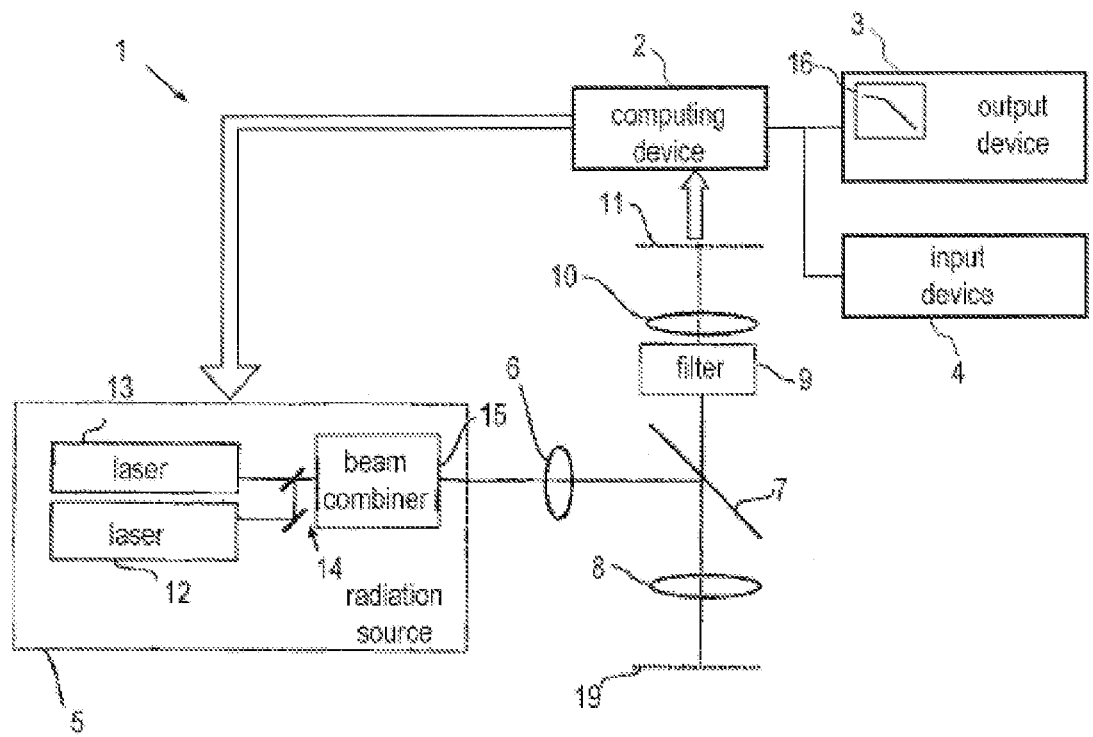
FIG. 1 is a schematic representation of a microscope system according to an exemplary embodiment of the invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

The terms "program," "software," "software application," and the like as used herein, are defined as a sequence of instructions designed for execution on a computer system. A "program," "software," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Embodiments of the invention will be explained in more detail. The description of embodiments is in no means limiting, but should be understood to be illustrative. While some embodiments will be described in the context of specific microscopy techniques, such as in the context of techniques that employ a structured illumination ("structured illumination microscopy", SIM) and/or in the context of PALM-techniques, embodiments are not limited to these specific fields of application. The features of the various embodiments may be combined with each other unless specifically excluded in the following description.

Described now are exemplary embodiments of the present invention. Referring now to the figures of the drawings in detail and first, particularly to FIG. 1, there is shown a schematic representation a first exemplary embodiment of a microscope system 1 according to the invention. The microscope system 1 has a computing device 2. The computing device 2 controls at least one controllable component of a microscope and processes frames captured by the microscope to thereby computationally combine a plurality of frames captured by the microscope into an image of the object. The computing device 2 is coupled to an optical output device 3. The optical output device 3 may be a display. As will be described in more detail, the computing device 2 is configured to output graphics data 16 over the optical output device 3, which provide the user with information on the procedure upon which data acquisition and/or data processing is based.

The microscope system 1 is configured to generate an enhanced resolution image of a sample. The microscope system 1 may be configured to generate this image by detecting a luminescence signal of molecules that can be optically activated. Examples for such procedures and techniques are known in the art under the names: PALM ("Photo Activated Localization Microscopy"), FPALM ("Fluorescence Photo-Activation Localization Microscopy"), STORM ("Stochastic Optical Reconstruction Microscopy"), SPDM ("Spectral Precision Distance Measurement"), PALMIRA ("PALM with Independently Running Acquisition"), GSDIM ("Ground State Depletion and Individual Molecular return") or dSTORM ("direct STORM"), which are illustrated by further references in L. Schermelleh et al., "A guide to super-resolution fluorescence microscopy", J. Cell Biol. 190(2): 165 (2010).

The microscope captures plural frames of the sample 19. The sample 19 may be marked with the dye DRONPA (see International Publication WO 2007/009812 A1) or with the dye DENDRA (see Gurskaya et al., Nature Biotech., Vol. 24, pages 461-465, 2006). In order to activate dye molecules and to excite the luminescence, the microscope has a radiation source 5, which includes at least one laser 12, 13. In the illustrated embodiment in which activation radiation and luminescence activation may have different wavelengths, the radiation source 5 comprises two lasers 12, 13. The output beams of the two lasers 12, 13 may be combined at a beam combiner 15. One of the lasers 12 and 13 may output radiation at a wavelength of 405 nm (activation beam). The other one of the lasers 12 and 13 may output radiation at a wavelength of 488 nm (excitation of luminescence and deactivation). When a dye is used, for which activation and excitation of luminescence can be done at the same wavelength, the radiation source 5 may be equipped with one laser only. The dye DENDRA mentioned above is exemplary for such a dye in which the activation of molecules and the excitation of luminescence may be performed using the same wavelength.

An optical filter 14 is provided downstream of the beam combiner 15. The optical filter 14 may be an acousto-optical filter 14. The optical filter 14 is used for wavelength selection. The optical filter 14 is also used for rapidly switching a laser wavelength output from the radiation source 5, and/or for selectively attenuating one of plural laser wavelengths output from the radiation source 5. A lens 6 or other optical component focuses the beam output from the radiation source 5 into a pupil of an objective 8 via a dichroic beam splitter 7. The lens 6, dichroic beam splitter 7 and objective 8 are configured such that the radiation beam output by the radiation source 5 is incident upon the sample 19 as a wide-field illumination.

Luminescence radiation output from the sample 19 is collected over the objective 8. The dichroic beam splitter 7 is configured such that it allows the luminescence radiation to pass therethrough. The luminescence radiation impinges onto a detector 11 via a filter 9 and a tube lens 10. The detector 11 may be a matrix detector. The detector 11 may be a CCD-detector.

The computing device 2 is coupled to the microscope. In the microscope system 1, the computing device 2 both controls operation of the microscope and processes raw data captured by the microscope. In order to control the microscope, the computing device 2 may be coupled to the radiation source 5, for example. The computing device 2 may be configured to control an intensity or a spectrum of the radiation output by the radiation source 5 towards the lens 6. Thereby, one of radiation used for activating dye or radiation used for exciting luminescence may be selectively output. The microscope may include additional components that are also controllable. For illustration, a device may be provided for adjusting an observation depth. Thereby, PALM data acquisition may be selectively performed for different object planes. In an implementation, the device for selecting an observation depth may perform a spatio-temporal pulse shaping. A depth resolution may thereby be attained using multiphoton excitations, as described in D. Oron et al., "Scanningless depth-resolved microscopy", Optics Express 13, 1468 (2005). Other configurations and implementations of controllable components of the microscope may be used in still other embodiments.

The computing device 2 is further configured to compute image data of the object 19 from a larger number of frames. For illustration, 10,000 or more frames may be computationally processed to generate the image data of the object 19. The computing device 2 may perform a non-linear mathematical operation on the captured luminescence signal. To this end, the computing device 2 may compute, for each one of plural pixels of the captured frame, a power or exponential function of the captured signal intensity. Alternatively or additionally, the computing device 2 may match a Gaussian fit function to the measured intensity distribution in order to localize the molecules in the captured frames. When a microscope is further configured to perform a three-dimensional (3D) luminescence microscopy, the computing device 2 may further automatically group molecule images. Thereby, luminescence signals that correspond to each other are identified in different frames that are associated with different object planes.

Generation of the resulting final image of the object 19 in the microscope system 1 is, therefore, done in a complex procedure, in which the underlying data processing may not be known to the user in detail. The procedure depends upon a plurality of adjustable parameters, for which the user may set various values. These adjustable parameters may include the intensity and the spectrum of switching signals for dye molecules in the sample, the size of a fitting mask which is used, or a filter function for filtering the frames to suppress image noise or similar. The user may set values for these various adjustable parameters over an input device 4. As will be explained in more detail below, the computing device 2 outputs information over the optical output device 3, in order to illustrate the influence of an adjustable parameter on the procedure upon which the data acquisition and/or the data processing is based. The data may be output automatically or in response to a dedicated user action.

Figure 2:
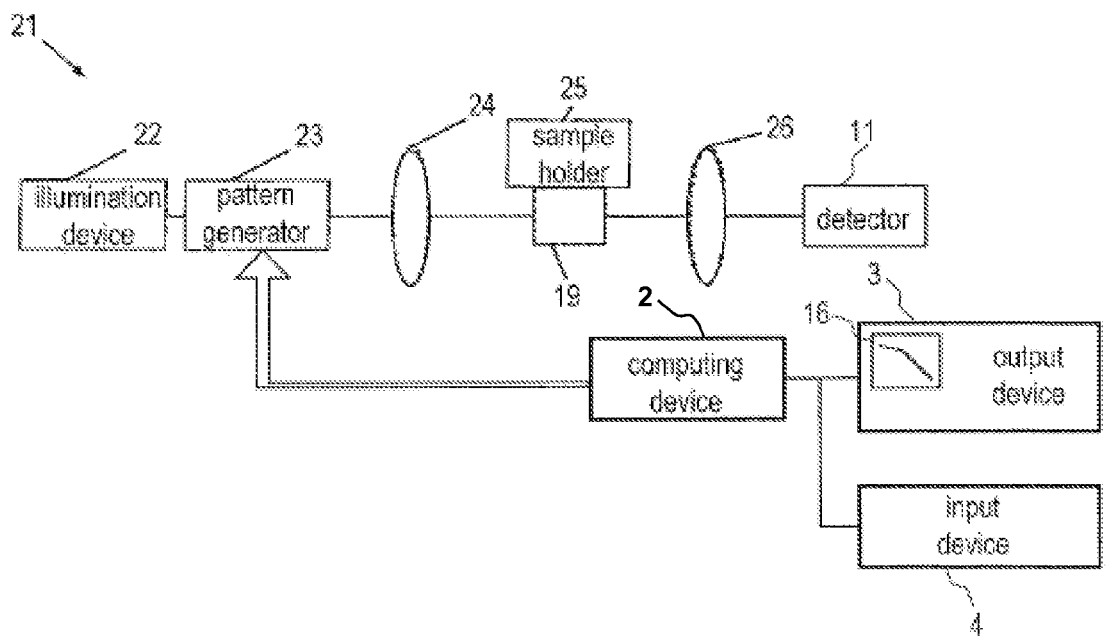
FIG. 2 is a schematic representation of a microscope system according to another exemplary embodiment of the invention.

FIG. 2 is a schematic representation of a microscope system 21 according to another embodiment. Components of the microscope system 21 that correspond, with regard to their configuration or operation, to components of the microscope system 1 are designated with the same reference numerals as in FIG. 1. The microscope system 21 is configured to image a sample with enhanced resolution, using a structured illumination.

The microscope system 21 includes an illumination device 22, at least one pattern generator 23, an illumination lens 24 or other optical component, a sample holder 25, imaging optics 26, and a detector 11. The components 22, 24-26 and 11 may have a configuration as known from light microscopy and from optical measurement and analysis techniques. For illustration, the components 22, 24-26 and 11 may have a configuration as used in an optical spectrometer.

The pattern generator 23 is generally configured to generate illumination conditions that have a predetermined spatial pattern when impinging onto the object 19. The pattern generator 23 may be or may include a mask having a predetermined one- or two-dimensional transmission characteristics. The mask may be formed by a diffraction grating or a phase grating. The mask may include a plurality of reflector or transmitter pixels in a matrix configuration. The pattern generator may include a "digital minor device" (DMD) or a LCD matrix configuration. The pattern generator 23 may alternatively or additionally include a minor configuration for generating an interference pattern. While the pattern generator 23 is illustrated in FIG. 2 as being disposed in between the illumination source 22 and the lens 24, the pattern generator may also be disposed in between the lens 24 and the object 19. The pattern generator 23 may also be provided directly at the object 19.

The computing device 2 is coupled to the pattern generator 23 to control the generation of different patterns. The computing device 2 is further configured to reconstruct an image of the object 19 from a plurality of frames, which are captured by the detector 11 for different positions or different orientations of the illumination pattern. The computing device 2 may perform the method described in European Patent EP 1 157 297 B1 to reconstruct the image of the object. The computing device 2 may also perform any other suitable method to computationally combine a plurality of frames captured for different positions or orientations of the illumination pattern into one resulting image of the object.

In the microscope system 21, a complex procedure is used to generate the resulting final image of the object 19. The procedure depends on a variety of adjustable parameters, the values of which may be set in a user-defined manner. The adjustable parameters may include the periodicity of the illumination pattern, the count of different orientations of the illumination pattern or a filter function for filtering captured frames. The user may set the values for these adjustable parameters using an input device 4. As will be described in more detail below, the computing device 2 is configured to output graphical information over the optical output device 3. The output graphics data represent an influence of an adjustable parameter on the procedure, upon which data acquisition and/or data processing is based. The computing device 2 may be configured to output the graphics data automatically or in response to a dedicated user action.

According to various embodiments, the computing device 2 of a microscope system outputs information to a user. This information may, in particular, be graphics data. The graphics data may illustrate how any one of various user settings for the plurality of adjustable parameters influences the procedure for data acquisition and/or data processing. The user is thereby aided in obtaining an intuitive understanding of the operation of the microscope system. The user may be provided with the information on the procedure at a time at which the user is in the process of setting values for the various adjustable parameters for performing data acquisition or for data processing of captured raw data. The processing of the captured raw data may include the processing of a plurality of frames using a computer to thereby generate image data of the object. Such a processing is used in microscopy using structured illumination or in PALM techniques as well as variants thereof.

The information that is output by the microscope system to the user in order to illustrate the affect of an adjustable parameter may, in particular, include graphics data. The graphics data may be animated data. The graphics data may be included in or otherwise associated with a video sequence. The graphics data may be selectively output in dependence on which one of plural adjustable parameters the user has selected, in order to set the value assigned to this adjustable parameter. The graphics data may also be selectively output in response to a dedicated user request for information on a particular one of the adjustable parameters, without it being required that the user adjusts the value assigned to this adjustable parameter. The graphics data may be output in an interactive manner, wherein the graphics data are adjusted in response to a user input. The graphics data may be generated such that it illustrates the influence of the selected adjustable parameter when a user adjusts the value of this adjustable parameter. In addition to graphics data, the output information may also comprise audio data.

In some implementations, the graphics data for at least one adjustable parameter that are used to explain data acquisition and/or data processing are independent of captured raw data. This allows the information to be provided before any raw data are captured.

In some implementations, a preview image may be computationally determined from raw data and may be output in addition to graphics data. The preview image may illustrate how the presently set values for the various adjustable parameters influence the resulting image data obtained by data processing.

By outputting the graphics data, information is provided to the user that assists the user in the process of planning data acquisition and/or planning data processing. For illustration, graphics data may be output to assist the user in the process of planning data acquisition, with the graphics data illustrating the influence of an adjustable parameter on the speed, sensitivity and resolution of the data acquisition procedure. Alternatively or additionally, graphics data may be provided that illustrate the data processing procedure. This aids the user in selecting the values for various parameters, such as an exposure time, laser power, parameters for image acquisition using a structured illumination (i.e., SIM techniques), parameters for a PALM technique or similar. In order to assist the user in planning data processing, graphics data may be output, which graphics data represent the operation of a filter as used in data processing for SIM or PALM techniques. Alternatively or additionally, graphics data may be output that illustrate the operation and affects of a fitting mask, which is used for localizing molecules in PALM techniques.

Referring now to FIGS. 3-9 and 11-19, implementations of graphical user interfaces will be described. Such user interfaces may be used in the microscope system 1 of FIG. 1 or in the microscope system 21 of FIG. 2. Depending on which one of plural adjustable parameters is selected by a user to request information thereon, one of a plurality of graphical representations may selectively be output to explain the underlying technique. The microscope system may be configured such that different graphics data are output in a sequential manner when a user sequentially selects different adjustable parameters to request information thereon. For any one of the graphics data, the outputting may be implemented as explained with reference to FIGS. 3-9 and FIGS. 11-19 below.

Figure 3:
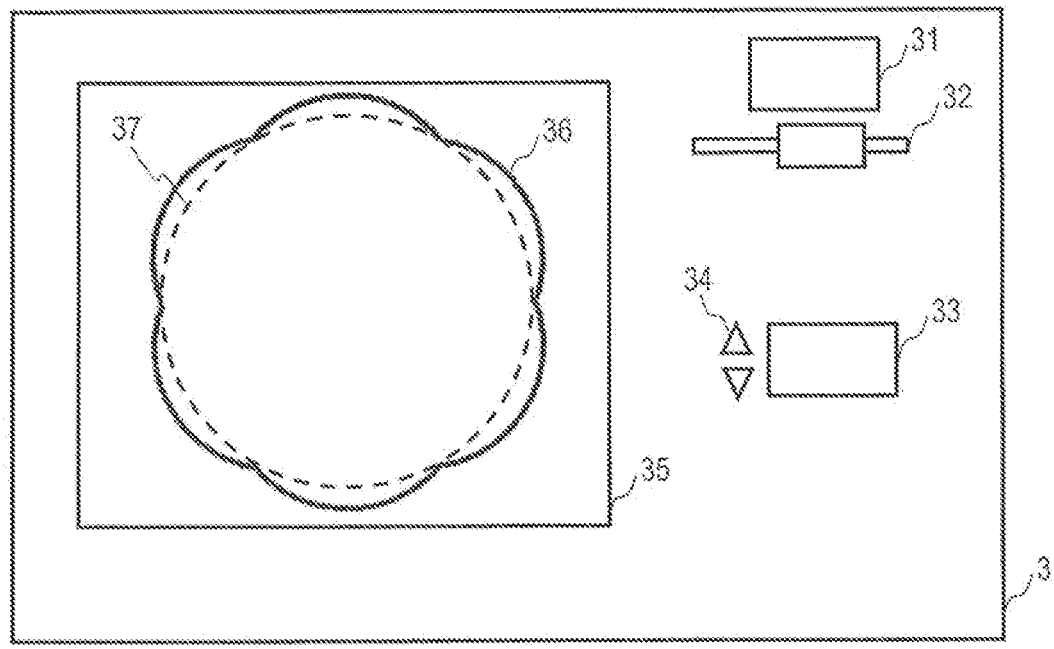
FIG. 3 schematically illustrates a graphical user interface of a microscope system according to an exemplary embodiment of the invention.
Figure 4:
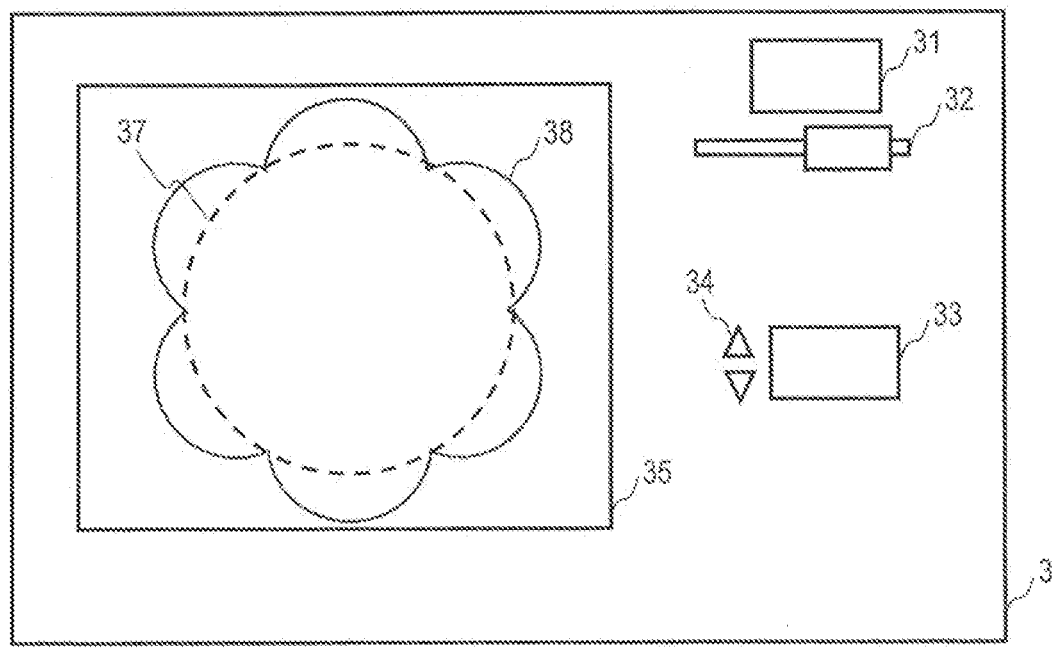
FIG. 4 schematically illustrates a graphical user interface of a microscope system according to another exemplary embodiment of the invention.
Figure 5:
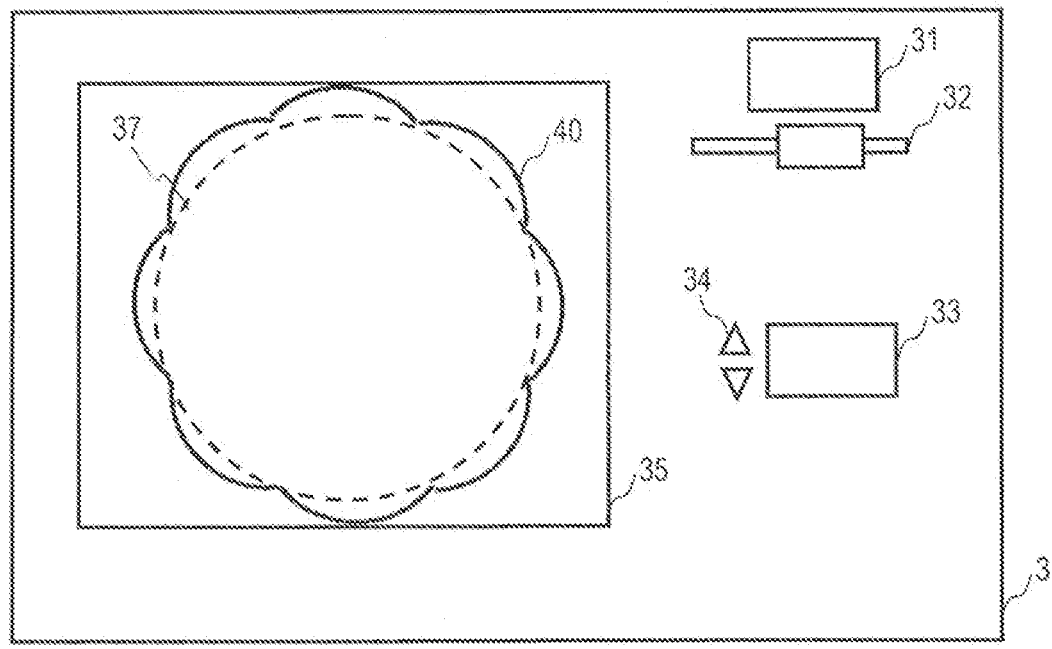
FIG. 5 schematically illustrates a graphical user interface of a microscope system according to a further exemplary embodiment of the invention.

FIGS. 3-5 schematically illustrate a graphical user interface. The graphical user interface may be output over an optical output device 3 of a microscope system. The microscope system may be configured to perform data acquisition according to a SIM technique. FIGS. 3-5 illustrate the outputting of graphics data that represent a k-space volume. The illustrated k-space volume may respectively be the volume reciprocal (i.e., k) space that can be sampled using the structured illumination.

The graphical user interface has a first display area 31 for displaying the value presently set for a first adjustable parameter. The graphical user interface shows a first adjusting element 32 that allows the user to adjust the value of the first adjustable parameter. The graphical user interface has a second display area 33 for displaying the value set for a second adjustable parameter and a second adjusting element 34 that allows the user to adjust the value set for the second adjustable parameter. For illustration, the first adjustable parameter may be the periodicity of an illumination pattern. The first adjustable parameter may be a line spacing of an illumination pattern. The second adjustable parameter may be the count of different orientations of the illumination pattern for which raw data acquisition is performed.

Graphics data 35 are output over the graphical user interface. The output graphics data 35 illustrate how the first adjustable parameter and the second adjustable parameter influence the procedure for SIM data acquisition and data processing. As illustrated in FIGS. 3-5, the graphics data 35 represent the volume in k-space, which is sampled when the SIM procedure is performed for the periodicity of the illumination pattern and the count of different orientations as set by a user. The computing device of the microscope system may compute the boundary of the k-space volume in dependence on the values for the periodicity of the illumination pattern and the count of orientations that have been set by the user. The computing device may control the optical output device 3 in dependence on the computed boundary. The computing device may control the optical output device 3 such that additional information is output. As illustrated in FIGS. 3-5, a graphical representation 37 may be output, which representation 37 corresponds to an isotropic resolution. This aids the user in determining values for the first adjustable parameter and the second adjustable parameters for which the resulting resolution is almost an isotropic resolution. Alternatively or additionally, a graphical representation 37 may be generated, which represents a desired target resolution. In this case, the graphical representation 37 indicates which volume of the k-space must at least be sampled so as to allow structures to be resolved at the target resolution.

The graphics data 35 may be generated in dependence of the values respectively set for the first adjustable parameter and the second adjustable parameter. When one of these values is adjusted, the graphics data 35 may be adjusted correspondingly.

FIG. 4 exemplarily illustrates how the graphics data are modified when the value set for the spatial periodicity of the illumination pattern is altered by a user. The boundary of the k-space volume covered in the SIM procedure, which is output to the user, is shifted from line 36 in FIG. 3 to line 38 in FIG. 4. FIG. 5 exemplarily illustrates how the graphics data are modified when a user adjusts the value for the count of the different orientations of the illumination pattern. The boundary of the k-space volume output to the user is shifted to line 40.

The graphics data 35 may be automatically output when a user activates one of the adjusting elements 32, 34. The graphics data 35 may automatically be output when the user adjusts one of the first adjustable parameter (such as periodicity) or the second adjustable parameter (such as count of different orientations of the illumination pattern) in another way. Alternatively or additionally, the graphics data 35 may selectively be output in response to a user action that indicates that the user requests information on the procedure according to which data acquisition or data processing is performed.

Figure 6:
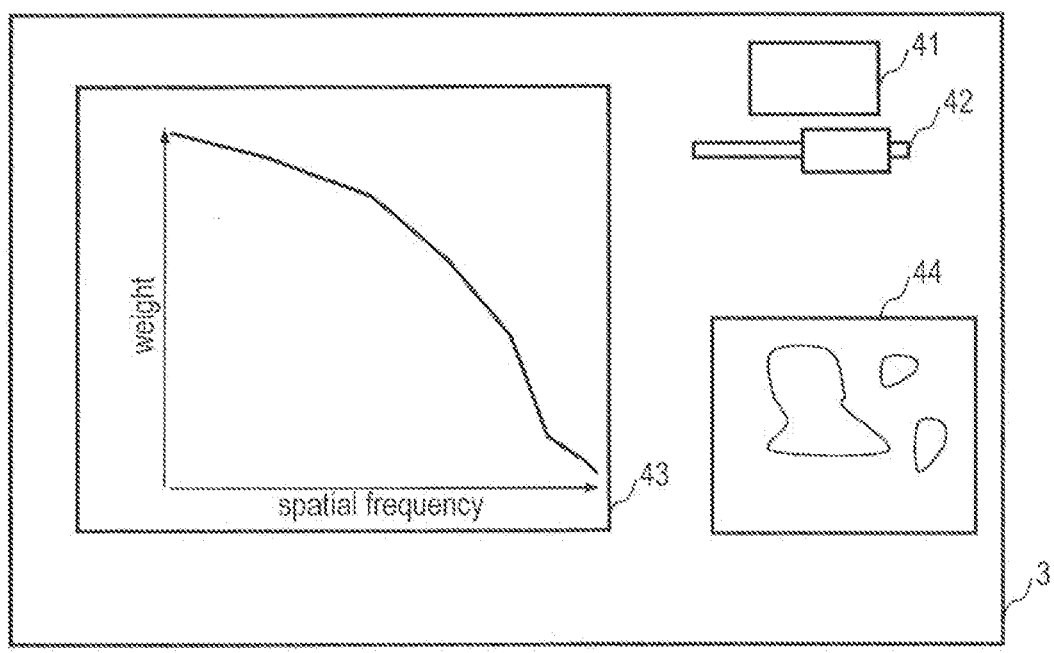
FIG. 6 schematically illustrates a graphical user interface of a microscope system according to yet another exemplary embodiment of the invention.

FIG. 6 schematically illustrates a graphical user interface that is output over an optical output device 3 of a microscope system. The graphical user interface includes graphics data which illustrate the affects of a filter in data processing. The microscope system may be configured to perform microscopy according to a SIM procedure, a PALM procedure or another procedure in which captured raw data are filtered.

The graphical user interface includes a display area 41 for displaying the value of an adjustable parameter and an adjusting element 42 for altering the value set for this adjustable parameter. For illustration, the adjustable parameter may be a cut-off frequency or a line width of a filter, which is used for filtering raw data. Various microscopy methods use filtering of raw data for noise suppression. The raw data may be frames captured in an SIM procedure or in a PALM procedure. By providing information on the filter or the filter characteristics, the user may be aided in identifying suitable settings for the adjustable parameter. The risk of the user selecting a value for the adjustable parameter that would lead to a loss of information may, thereby, be mitigated.

The graphical user interface includes graphics data 43 that illustrate the affects of the adjustable parameter on the filtering step of the procedure for data processing. In some implementations, a filter characteristic or a transmission function of the filter may be displayed as a function spatial frequency. The graphics data 43 may be adaptively adjusted to the new value set for the adjustable parameter when this value is changed in response to a user input.

The filter characteristics may be set by the user after data acquisition of raw data has already been performed. In this case, a preview image 44 may be generated using previously captured raw data. The preview image 44 may be generated using the value set for the filter characteristics. The preview image 44 may be output in combination with the graphics data 43 on the graphical user interface.

Figure 7:
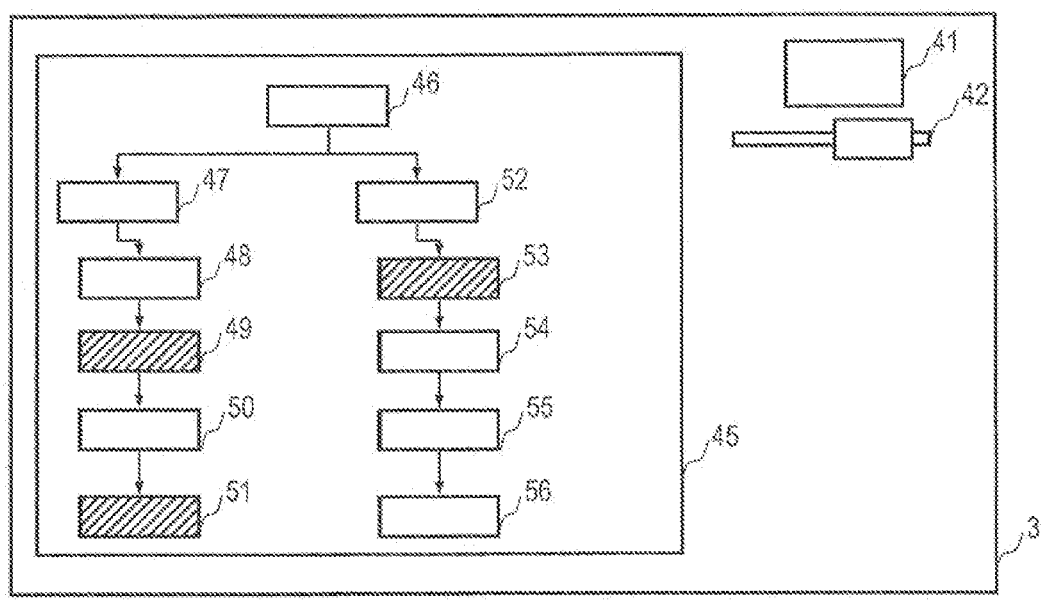
FIG. 7 schematically illustrates a graphical user interface of a microscope system according to still another exemplary embodiment of the invention.

FIG. 7 schematically illustrates a graphical user interface that may be output via an optical output device 3 of a microscope system. The graphics data output via the graphical user interface illustrate and explain how the data processing procedure is carried out. The microscope system in which the graphical user interface is output may be configured to perform microscopy according to a SIM procedure, a PALM procedure or another procedure in which complex data processing is performed, with the data processing procedure comprising a plurality of different processing steps. The graphical user interface has a display area 41 for outputting a value of an adjustable parameter and an adjusting element 42 that allows a user to adjust the value set for the adjustable parameter.

Graphics data 45 are output over the graphical user interface. The graphics data 45 schematically illustrate the procedure for data processing. Any one of a variety of different representations of the workflow of data processing may be used. For illustration, a flowchart representation may be used as shown in FIG. 7. Alternatively or additionally, a schematic representation may be used that illustrates the affects of different steps of the workflow in Fourier space or in image space.

The graphics data 45 may be generated and output in dependence on an adjustable parameter that has been selected by the user. For illustration, the graphics data 45 may be generated and output for a procedure having plural steps 46-56 such that those steps 49, 51, 53 are highlighted, which are immediately influenced by the selected adjustable parameter. To aid understanding of the graphics data 45, textual information may be incorporated into the graphics data 45. For illustration, block 46 may include textual information "SIM data processing". Blocks 47-51 may respectively include textual information to explain that the respective process step is a step of pre-processing (block 47), of subtracting a background signal (block 48), of performing a scaling (block 49), of separating different imaging orders of the SIM imaging (block 50) and of storing the intermediate results (block 51). Blocks 52-56, when displayed, may respectively include textual information that explains the operation and meaning of the respective block. For illustration, block 52 may contain textual information which indicates that block 52 corresponds to the main processing. Block 53 may contain textual information which indicates that block 53 corresponds to a processing step in which different orders of the k-space images are shifted. Block 54 may contain textual information which indicates that block 54 corresponds to a processing step in which mixing information is determined according to a signal-to-noise ratio. Block 55 may contain textual information which indicates that block 55 corresponds to a processing step in which filtering is performed. Block 56 may contain textual information which indicates that block 56 corresponds to a processing step in which a back-transformation is carried out. The graphics data 45 may include additional blocks for post-processing. The post-processing may include steps of clipping, isotropic resolution and aligning color channels.

Figure 8:
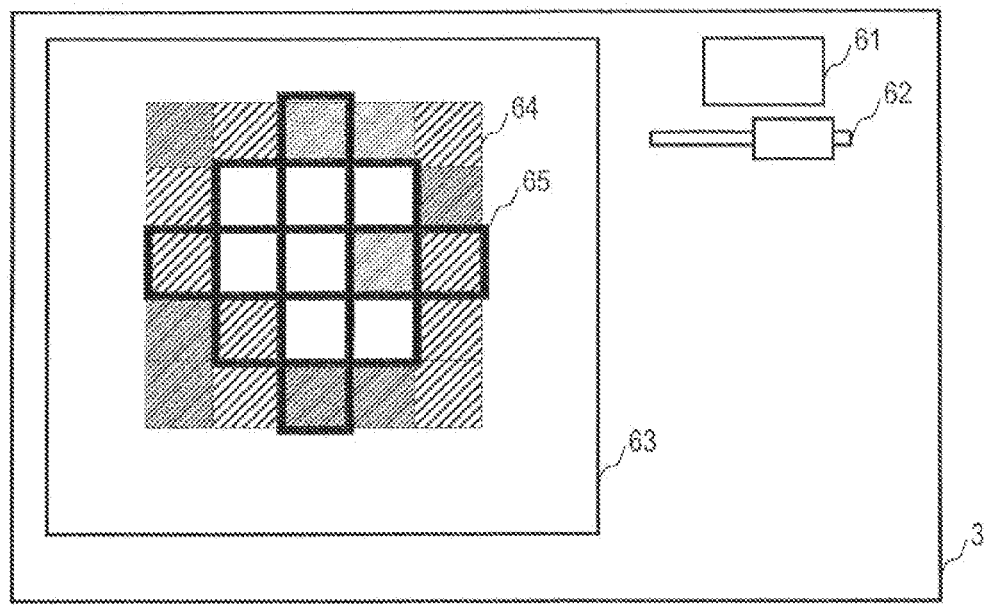
FIG. 8 schematically illustrates a graphical user interface of a microscope system according to still a further exemplary embodiment of the invention.
Figure 9:
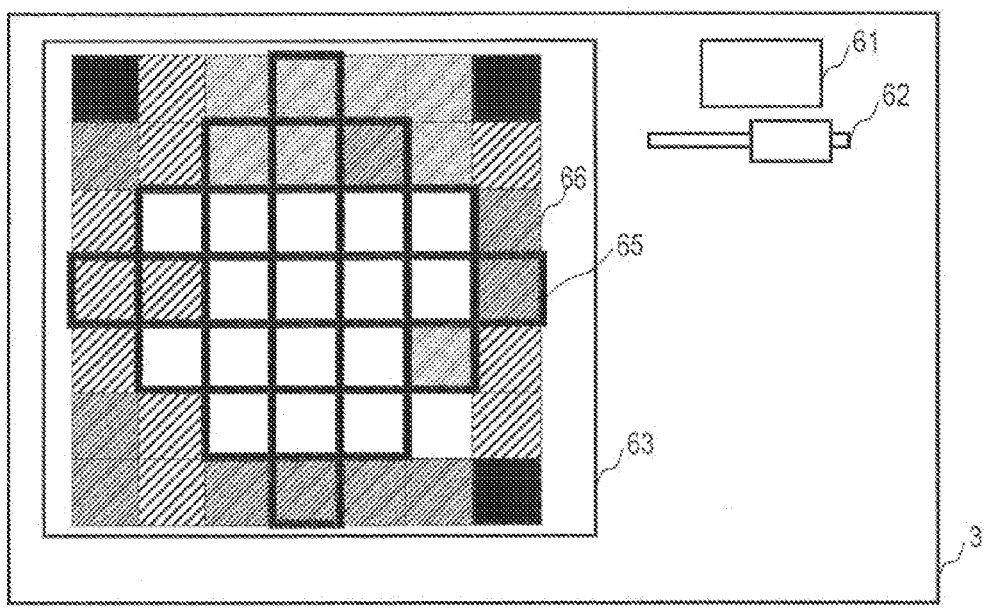
FIG. 9 schematically illustrates a graphical user interface of a microscope system according to yet a further exemplary embodiment of the invention.

FIGS. 8 and 9 schematically illustrate a graphical user interface that is output over an optical output device 3 of a microscope system. The illustrated graphics data are generated and output for explaining the influence of a fitting mask when localizing molecules. The microscope system using this graphical user interface may be configured to perform microscopy according to a PALM procedure or another procedure in which a fitting mask is matched to captured raw data. Examples for such procedures include luminescence microscopy procedures in which a fitting mask is superimposed on the raw data in order to localize molecules.

The graphical user interface has a display area 61 for displaying the value of an adjustable parameter. The graphical user interface has an adjusting element 62 for allowing a user to adjust the value set for the adjustable parameter. The adjustable parameter may be a size of a Gaussian fitting mask. Such a fitting mask may be used in data processing of a PALM procedure or in related microscopy procedures. The user may be aided in selecting a suitable fitting mask when information on the fitting mask is output via the graphical user interface.

Graphics data 63 output via the graphical user interface graphically illustrate the influence of the fitting mask size that is used in localizing molecules. When the value for the adjustable parameter is altered, the graphics data 63 may adaptively be modified such that they correspond to the new value for the size of the fitting mask that has been set by the user. In the graphics data 63, the fitting mask may be superimposed onto a camera signal or a portion of a camera signal so as to assist the user in selecting an appropriate size for the fitting mask.

The graphics data 63 include the camera signal 64 or 66 of one molecule. If the graphics data 63 are output after raw data acquisition has been performed, the camera signal 64 or 66 may be data captured in raw data acquisition. Alternatively, the computing device may include a library of exemplary data that are integrated into the graphics data 63. The exemplary data may represent characteristic images of molecules in dependence on values set for various adjusting parameters that influence the data acquisition. The computing device may also be configured to generate the exemplary data 64 or 66 using a simulation process. In FIGS. 8 and 9, different densities of hatch lines are used to illustrate different brightness levels.

The graphics data 63 further include a representation 65 of the fitting mask. This representation 65 of the fitting mask is shown as being superimposed on the camera signal. When the user adjusts the value of the adjustable parameter using the adjusting element 62, the representation 65 of the fitting mask is modified accordingly.

Figure 10:
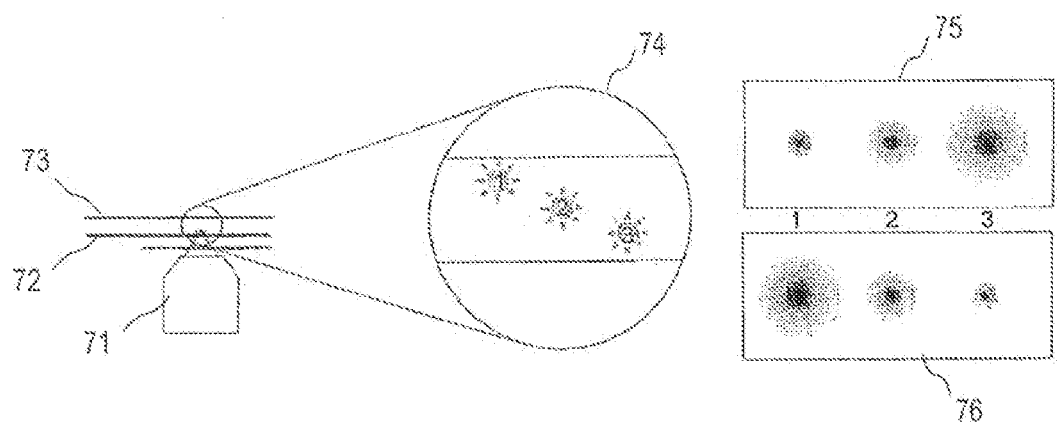
FIG. 10 illustrates operation of a microscope system for three-dimensional luminescence imaging.
Figure 11:
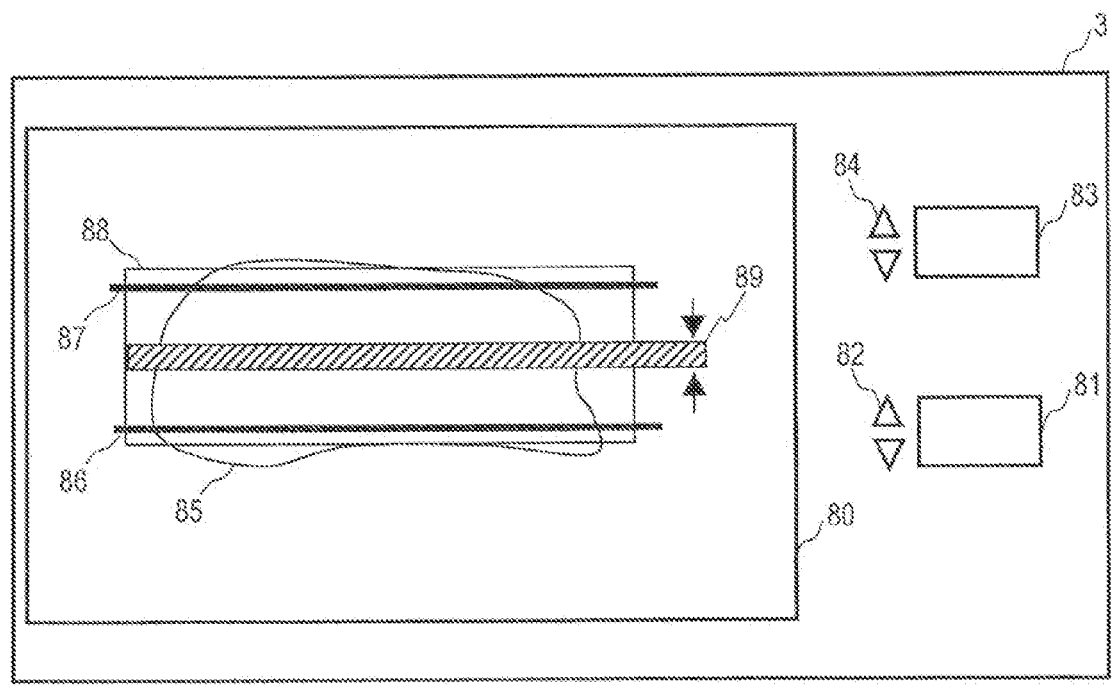
FIG. 11 schematically illustrates a graphical user interface of a microscope system according to another exemplary embodiment of the invention.

With reference to FIGS. 10 and 11, outputting of graphics data will be explained in the context of a method and system for luminescence microscopy that allows a three-dimensional image to be generated. A three-dimensional PALM procedure is exemplary for such a method and corresponding microscope system. The microscope system may include a device for selecting an observation depth in order to allow such three-dimensional images to be generated.

FIG. 10 illustrates a method and microscope that allow three-dimensional luminescence microscopy to be performed. Light may be irradiated onto the sample over an objective 71 of a microscope to perform multi-photon-excitation of dye molecules. A device for spatio-temporal pulse shaping may be provided to adjust an observation depth. This allows one or plural two-dimensional images to be captured for each one of plural object planes 72, 73. Inset 74 in FIG. 10 schematically illustrates a case where there are three fluorescent molecules. The 2D-image 75 captured for object plane 72 shows images of the three molecules respectively having different size and intensity. The variation in size and intensity is caused by the different positions of the molecules along the axial direction of the microscope. The captured 2D-image 76 for object plane 73 also shows images of the molecules having different size and intensity. Again, the variation in size and intensity is caused by the different positions of the molecules along the axial direction of the microscope. This information may be used to not only determine the lateral position of the molecules, but also allows the position of the molecules to be determined along the axial direction of the beam. There is an interrelation between the resolution in axial direction that can be attained and the length in axial direction in which measurements may be made.

FIG. 11 schematically illustrates a graphical user interface that may be output over an optical output device 3 of a microscope system. The graphical user interface includes graphics data that illustrate the influence of the positions of the object planes on the axial resolution and the length of the measurement area in axial direction. The microscope system may be configured to perform microscopy according to a PALM procedure for three-dimensional imaging.

The graphical user interface has a first display area 81 for displaying the value of a first adjustable parameter. The graphical user interface further shows a first adjusting element 82 that allows a user to adjust the value of the first adjustable parameter. The graphical user interface has a second display area 83 for displaying the value of a second adjustable parameter. The graphical user interface has a second adjusting element 84 that allows a user to adjust the value set for a second adjustable parameter. For illustration, the first adjustable parameter may represent the position of a first object plane in the three-dimensional microscopy along an axial direction of a microscope. The second adjustable parameter may represent the position of a second object plane in three-dimensional microscopy along the axial direction of the microscope.

Graphics data 80 are output over the graphical user interface. The graphics data 80 illustrate the influence of the first adjustable parameter and of the second adjustable parameter on the PALM procedure, upon which data acquisition and data processing is based. The graphics data 80 represent the position of the object planes 86 and 87 as well as the measurement area 88 in which three-dimensional measurements can be performed and the axial resolution 89 that can be attained. These pieces of information may be superimposed on an overview image 85 of the object. The computing device of the microscope system may compute the measurement area 88 and the resolution 89 that can be attained in dependence on the values that are respectively set for the positions of the first and second object planes. In addition, the computing device may compute the measurement area 88 and the resolution 89 in dependence on additional information that may be input by a user, such as the density of the fluorescent molecules in the sample.

The graphics data 80 may be generated in dependence on the values that are respectively set for the first adjustable parameter and the second adjustable parameter. When one of these values is altered, i.e., when the position of one of the object planes is shifted, the graphics data 80 may be adapted in a corresponding manner.

While graphics data generated and output for explaining data acquisition or data processing for PALM procedures were explained with reference to FIGS. 8-11 in the context of some examples, graphics data may selectively be output for additional adjustable parameters. Yet another example for such an adjustable parameter is a setting that specifies whether molecule images stemming from different object planes are to be grouped before or subsequent to localizing the individual molecules. Graphics data may be generated and output that illustrate the differences in data processing for the two variants. For each one of the two variants, a preview of the data that would result for the respective setting may also be generated and output.

Figure 12:
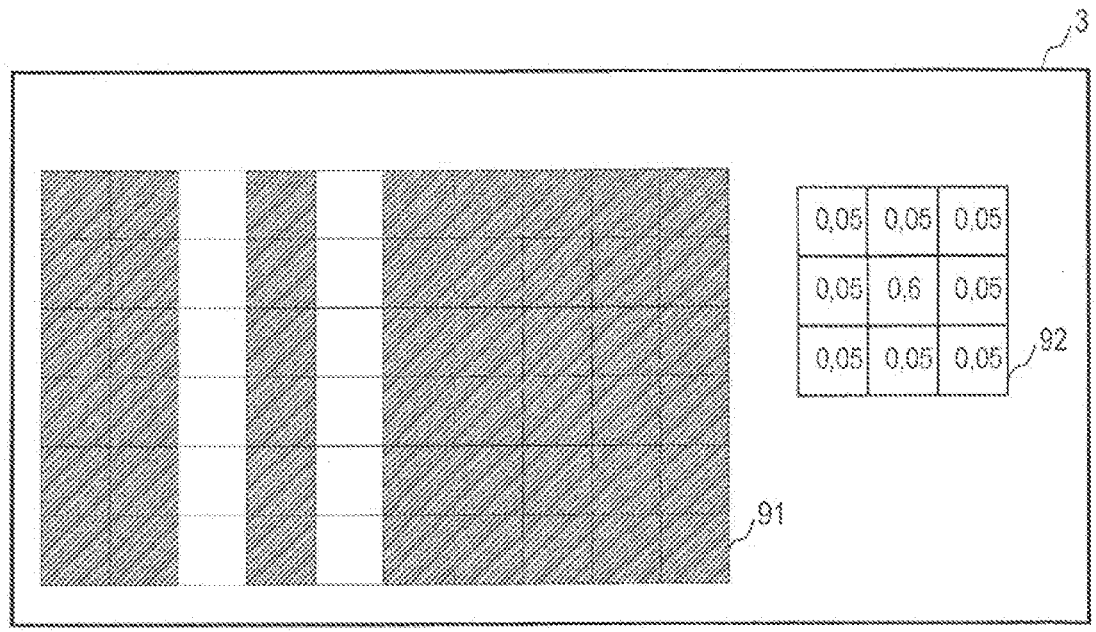
FIG. 12 schematically illustrates a graphical user interface of a microscope system according to a further exemplary embodiment of the invention.
Figure 13:
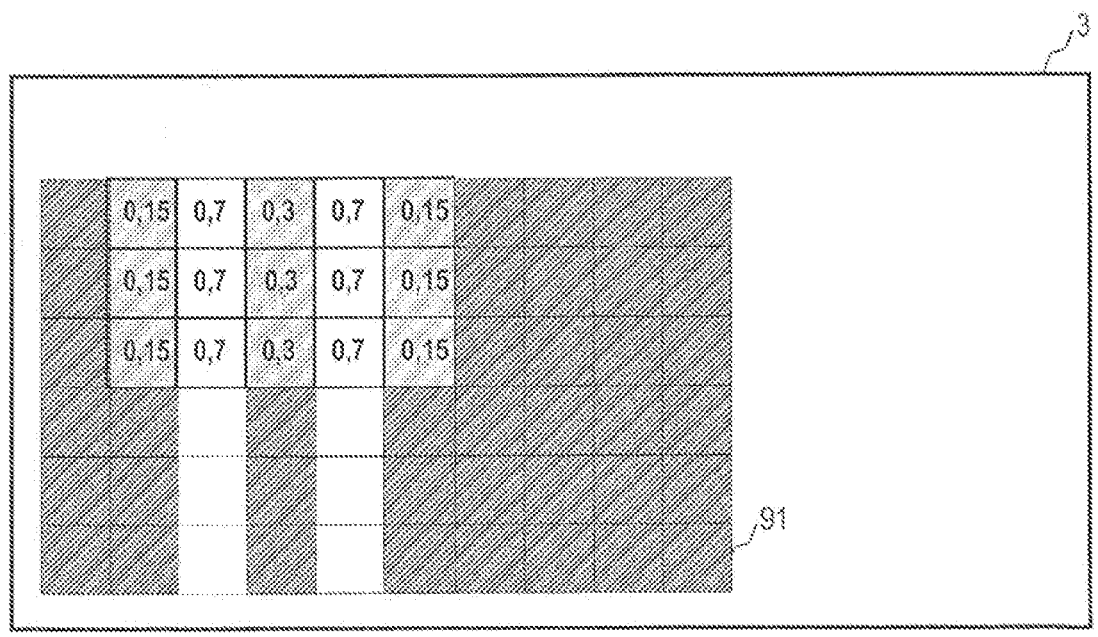
FIG. 13 schematically illustrates a graphical user interface of a microscope system according to an added exemplary embodiment of the invention.

FIGS. 12 and 13 schematically illustrate a graphical user interface that may be output over an optical output device 3 of the microscope system. The graphical user interface includes graphics data that illustrate the affect of data filtering. The microscope system may be configured for microscopy according to a SIM procedure, a PALM procedure, or another procedure in which raw data are filtered. Graphical data as schematically illustrated in FIGS. 12 and 13 may be output as soon as a user requests information on data filtering and the affects of data filtering on the procedure according to which data processing is performed.

A data array 91 is shown on the graphical user interface. The pixel values of the array are indicated by different brightness levels and/or different numerical values that may be shown in the different fields of the data array 91. A filter kernel 92 having exemplary filter coefficients is also shown in the graphical user interface. The filter coefficients may be determined as a function of values for a filter that are presently set for data processing.

A user may shift the filter kernel 92 to various positions of the data array 91, as schematically illustrated in FIG. 13. In response thereto, the affects that the filter kernel has at the various positions of the data array are computed and output on the graphical user interface. As schematically shown in FIG. 13, numerical values may be determined and output that result when the data array 91 is filtered with filter kernel 92 in dependence on the position at which the filter kernel 92 has been positioned. The result of the filtering using the filter kernel 92 may be coded in a variety of alternative or additional manners. For illustration, the result of the filtering may be output using different grey scale levels, different colors or similar to illustrate the affect of the filter on the data array 91.

The data array 91 may be an array of exemplary data. If raw data have already been captured, the data array 91 may be a portion of the captured raw data. The user may then selectively position a filter kernel over a portion of the raw data that is of interest to the user. In response thereto, the user will directly understand the affect of the filtering on this specific portion of the raw data. Various filter characteristics may thus be tested. Subsequently, data processing may be performed using a filter kernel set in a user-defined manner.

Figure 14:
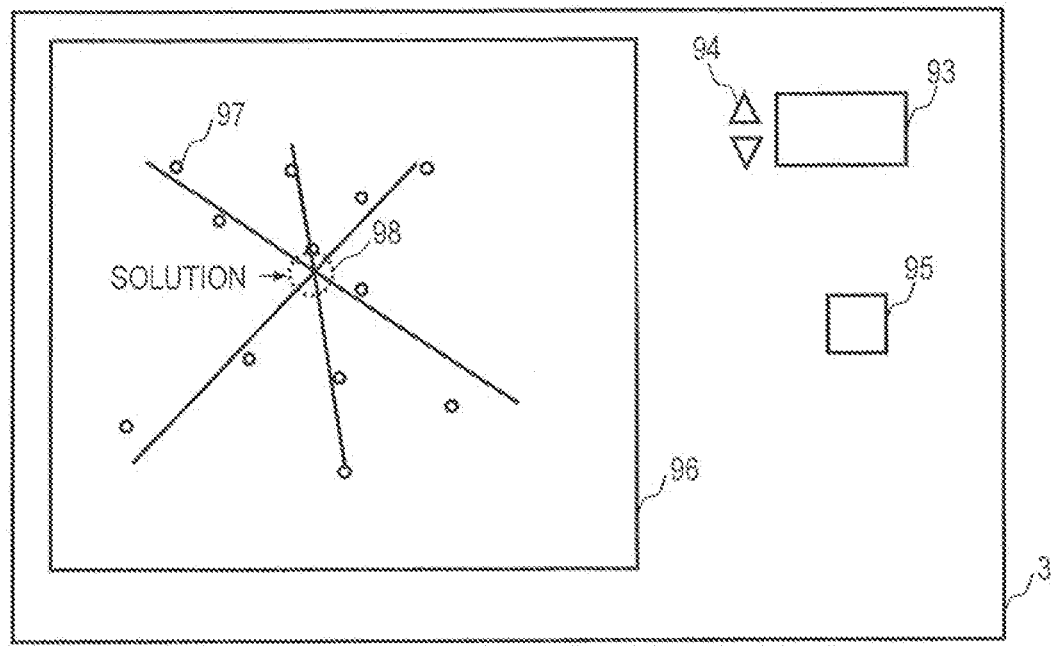
FIG. 14 schematically illustrates a graphical user interface of a microscope system according to an additional exemplary embodiment of the invention.
Figure 15:
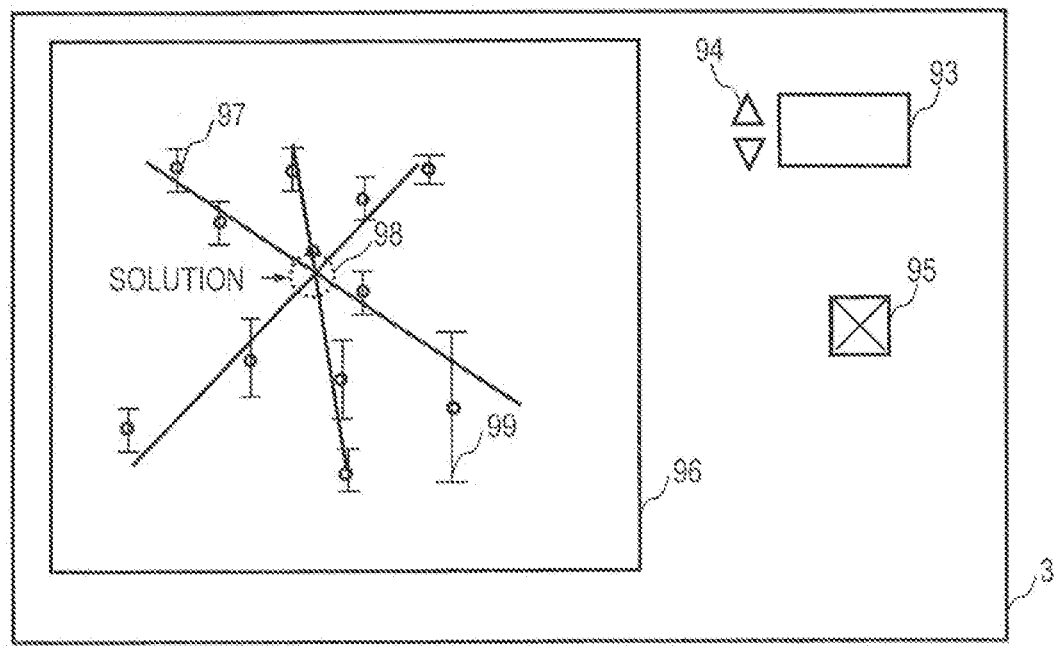
FIG. 15 schematically illustrates a graphical user interface of a microscope system according to yet another exemplary embodiment of the invention.

FIGS. 14 and 15 schematically illustrate a graphical user interface that is output over an optical output device 3 of a microscope system. The graphical user interface includes graphics data that illustrate a demixing of multi-channel images. The microscope system may be configured to perform a method in which multi-channel images are demixed in the data processing phase. Graphics data as schematically illustrated in FIGS. 14 and 15 may be output when a user requests information on channel demixing. This aids the user in understanding how varying a channel count or selecting an option of weighting data according to data uncertainties affects the data processing.

The graphical user interface has a first display area 93 for displaying the value of an adjustable parameter. The graphical user interface has a first adjusting element 94 that allows a user to adjust a value set for the adjustable parameter. For illustration, the adjustable parameter may be a channel count, i.e., may represent the total number of different channels. The graphical user interface further has a second adjusting element 95 for selecting a weighting option.

Graphics data 96 are output on the graphical user interface. The graphics data 96 illustrate how the channel count and the weighting option affects the data processing. The graphics data 96 may be adapted in response to a user input that varies the channel count or the selection of the weighting option. For illustration, when a user selects the weighting option, the graphics data 96 may be adapted accordingly to reflect this user selection.

In technical terms, demixing of multi-channel images can be analogized to solving an over-determined set of equations. The solution may be done using, for example, the method of least squares. To visualize the channel demixing, graphics data may be generated and output that analogize the solution of the set of equations to identifying mean straight lines through a plurality of measurement points. The intersection point of the mean straight lines corresponds to the solution of the set of equations. FIG. 14 schematically illustrates graphics data 96 having a plurality of measured data 97 and associated mean straight lines. The uncertainty of the solution may schematically be represented as a circle 98 around the intersection point of the mean straight lines. Channel demixing of the multi-channel images as solution of an over-determined set of equations is hereby represented as intersecting straight lines in two dimensions. This visualizes the operation principle of the underlying algorithm in the n-dimensional data space in which the channel demixing is actually performed.

FIG. 15 illustrates how the graphics data 96 are adapted when the weighting option is selected. To visualize the affect of the weighting option, error bars 99 may additionally be shown. Further, the weighting function may lead to a shift in the solution and/or to a change in the uncertainty of the indicated solution. This may also be reflected in the graphics data 96.

In various embodiments, graphics data may be output over the optical output device of the microscope system in order to illustrate optical transitions in molecules. The illustrated optical transitions may be optical transitions that may be excited in data acquisition. Examples where such graphics data may be useful include microscope systems for luminescence microscopy, for example, microscope systems that are configured to perform microscopy according to the PALM procedure. The computing device of the microscope system may compute occupation probabilities for molecular states and/or transition rates between molecular states of molecules that can be optically activated or optically switched, respectively in dependence on values for adjustable parameters that are set by a user. For illustration, occupation probabilities and/or transition rates between molecular states may be computed for dye molecules. The occupation probabilities and/or transition rates may be output as graphics data over the optical output device. The output graphics data may include a representation of a Jablonski diagram or of a Markov diagram. The graphics data including the diagram may be adjusted when a value for a power density or a wavelength of a switching signal used for switching dye molecules is adjusted. The graphics data including the diagram may also be adapted when a power density or a wavelength of an excitation signal used to excite luminescence of the dye molecules is adjusted. With reference to FIGS. 16-19, such implementations will be described in more detail.

Figure 16:
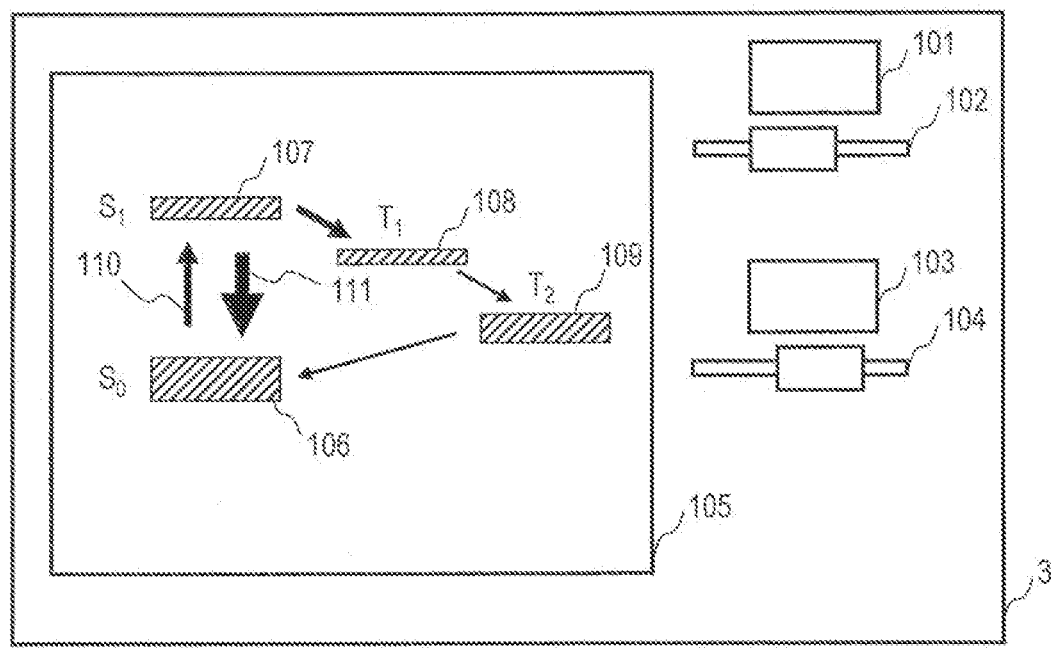
FIG. 16 schematically illustrates a graphical user interface of a microscope system for carrying out a luminescence microscopy method according to an exemplary embodiment of the invention.
Figure 17:
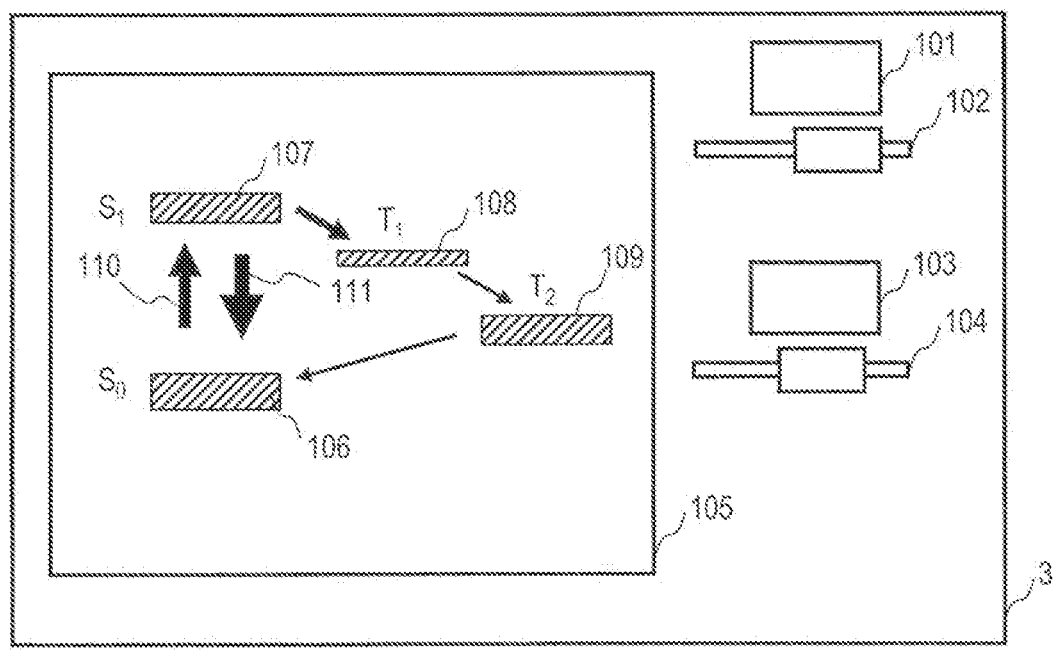
FIG. 17 schematically illustrates a graphical user interface of a microscope system for carrying out a luminescence microscopy method according to another exemplary embodiment of the invention.

FIGS. 16 and 17 schematically illustrate a graphical user interface. The graphical user interface may be output over an optical output device 3 of a microscope system. The graphical user interface may include graphics data to visualize the influence of adjustable parameters on the occupation probabilities of molecular states and/or on transition rates between molecular states. The microscope system may be configured to perform a luminescence microscopy in which molecules are optically switched or optically activated to capture raw data. Graphics data including a diagram as shown in FIGS. 16 and 17 may for example be output when a user requests information on how a change in laser power density or a change in laser spectrum affects a luminescence signals which can be detected.

The graphical user interface has a first display area 101 for displaying the value of a first adjustable parameter. The graphical user interface has a first adjusting element 102 that allows the user to adjust the value of the first adjustable parameter. The graphical user interface has a second display area 103 for displaying the value set for a second adjustable parameter. The graphical user interface has a second adjusting element 104 that allows a user to adjust the value set for the second adjustable parameter. For illustration, the first adjustable parameter may correspond to a power density of a laser. The second adjustable parameter may correspond to a spectrum of the laser or to the wavelength at which the laser spectrum has its maximum, wherein the laser is used for switching and/or activating the molecules.

Graphics data 105 are output on the graphical user interface. The graphics data 105 represent the influence of the laser power and/or the laser spectrum on the molecular processes that are triggered in data acquisition. The graphics data 105 may schematically show different molecular states. For illustration, as shown in FIGS. 16 and 17, two singlet and two triplet states may be shown. Additionally, arrows are shown that represent transitions between the molecular states.

The computing device of the microscope system is configured to compute occupation probabilities of the different molecular states as a function of the values set for the first and second adjustable parameters. Alternatively or additionally, the computing device may be configured to compute transition rates between these molecular states as a function of the values that have respectively been set for the first and second adjustable parameters. The computing device may determine the occupation probabilities and/or transition rates in dependence on the optically active molecule that is used in the sample. The molecule may be a molecule of a particular dye. In some implementations, the user may input information on the optically active molecule or the dye over a user interface. In other implementations, the computing device may be configured to control the microscope system such that, in a first data acquisition, a spectral scan is acquired, which may have a coarse spectral resolution. The computing device may then automatically determine the dye that is used by comparing the captured spectrum to data stored in a database.

In order to determine the transition rates, the computing device may query a database. The database may include the values for the transition rates as a function of plural discreet values of the first and second adjustable parameters. For illustration, the transition rates may be stored in the database for plural laser powers and for plural laser spectra. The computing device may be configured to interpolate or extrapolate the transition rates stored in the database, in dependence on the values set for the power and wavelength that have been set by the user for the switching signal or the excitation signal. The occupation probabilities may, then, be computed by the computing device based on the transition rates. Mathematical procedures known for Markov processes may be used to determine the occupation probabilities as a function of the transition rates.

Alternatively, occupation probabilities and/or transition rates may be computed using a model. In order to determine the occupation probabilities and/or transition rates, the computing device may retrieve the relevant molecular parameters from a database. Examples for relevant molecular parameters include transition matrix elements for optical transition, relaxation rates for spontaneous relaxation, and other transition probabilities. The transition rates are, then, computed as a function of the values set for the adjustable parameters by the user. The model that is used to compute the transition rates may depend on additional parameters, such as temperature. The computing device may be coupled to sensors of the microscope in order to automatically retrieve information on current values of the temperature, the pH value of the sample, or other ambient parameters. The computing device may use these sensor outputs when determining occupation probabilities and/or transition rates. Alternatively or additionally, the computing device may allow a user to input values for temperature or pH value so that the user may be provided with information that indicates the influence of temperature or PH value on the optical processes. The occupation probabilities may be computed using the transition rates, for example, based on techniques developed for Markov processes.

In the implementation illustrated in FIGS. 16 and 17, the computing device controls the optical output device such that the occupation probabilities computed by the computing device are visualized on the optical output device 3. The computing device may generate the graphics data 105 in a manner, in which a size or a color coding of bar symbols 106-109 is proportional to the occupation probabilities. The bar symbols 106-109 are assigned to the relevant molecular states of the molecules that can be optically activated or optically switched. Additionally or alternatively, information on the transition rates may be output. The computing device may generate the graphics data 105 such that the thickness of the transition arrows 110, 111 is proportional to the transition rate. Alternatively or additionally, occupation probabilities and/or transition rates may also be indicated using alphanumerical symbols in the graphics data 105.

As illustrated in FIG. 17, the computing device may adapt the graphics data 105 as a function of the values that are respectively set for the adjustable parameters by the user. If the user increases the setting for the laser power, the graphics data 105 may be adjusted such that they represent the new occupation probabilities and/or transition rates.

Graphics data that represent the occupation probabilities may also be adjusted in a time-varying manner so as to visualize the dynamical process of increasing or decreasing population of individual molecular states. Such dynamics result after a switching or activation signal has been irradiated on the optically active molecules. Thereby, the user is provided with an intuitive understanding of the processes on which the data acquisition and data processing is based.

Information on occupation probabilities and/or transition rates may not only be output in form of Jablonski diagrams, but also in the form of Markov diagrams. This will be explained in more detail with reference to FIGS. 18 and 19.

Figure 18:
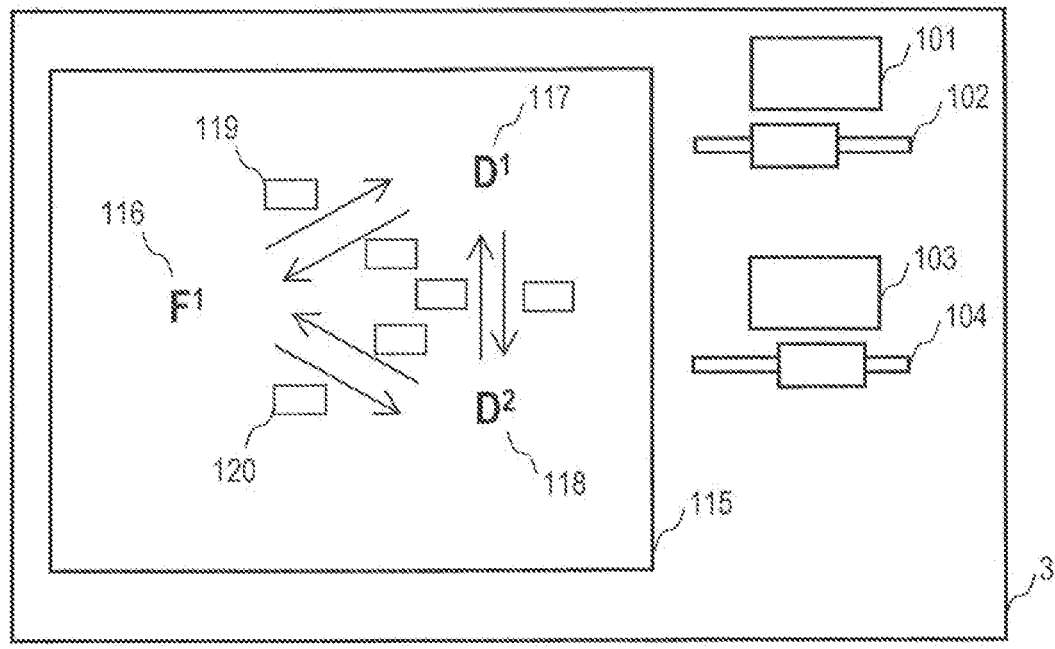
FIG. 18 schematically illustrates a graphical user interface of a microscope system for carrying out a luminescence microscopy according to a further exemplary embodiment of the invention.

FIG. 18 illustrates graphics data 115 which are output via the optical output device of a microscope system. The graphics data 115 are generated by the computing device of the microscope system. The graphics data 115 include a Markov diagram in which the various relevant states of the dye molecule are indicated by alphanumerical signs 116-118. The relevant states of the dye molecule may be automatically determined by the computing device, as explained with reference to FIGS. 16 and 17. The molecular states that are relevant may also vary as the power density or a spectrum of the signals that are used for excitation or switching of molecules is varied. The transition rates determined by the computing device may be output as numerical values. The numerical values are indicated by boxes 119, 120, which may be integrated into the Markov diagram. The transition rates may be determined as explained with reference to FIGS. 16 and 17.

Additional information may be output to further aid the user's understanding of the procedure upon which data acquisition is based. For illustration, the computing device may be configured to compute the average period for which a dye molecule stays in a fluorescent state. This period depends on the power density of an excitation signal. An implementation will be described in more detail with reference to FIG. 19.

Figure 19:
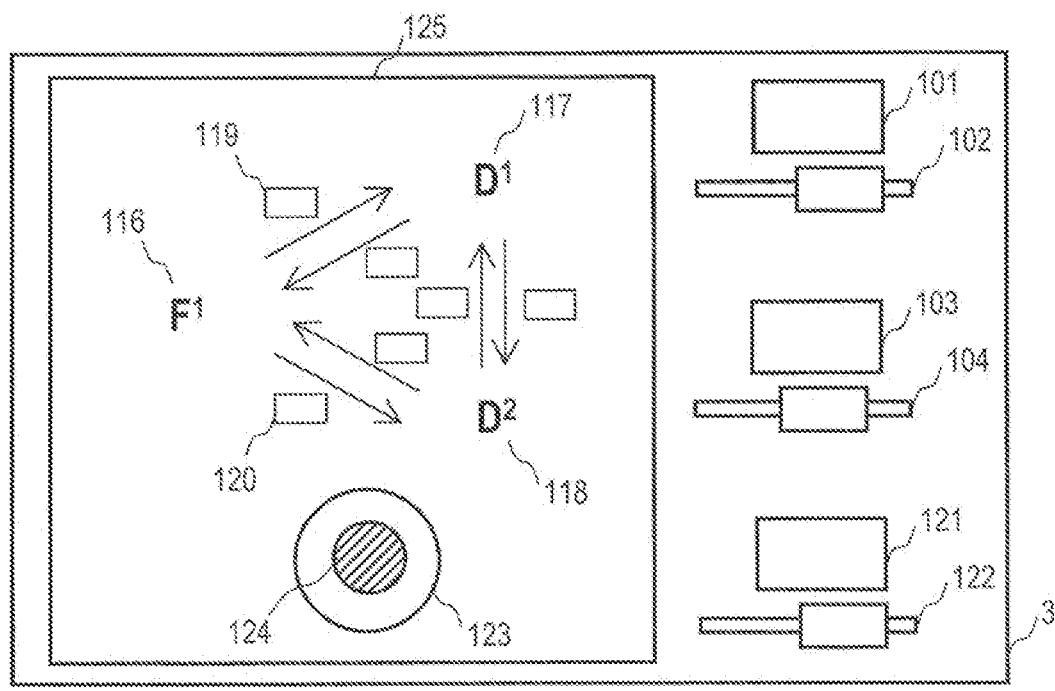
FIG. 19 schematically illustrates a graphical user interface of a microscope system for carrying out a luminescence microscopy according to an added exemplary embodiment of the invention.

FIG. 19 schematically illustrates a graphical user interface that is output over an optical output device 3 of a microscope system. The microscope system may be configured to perform luminescence microscopy according to a procedure in which molecules are optically switched or optically activated to capture raw data.

The graphical user interface includes graphics data 125. The graphics data 125 include a Jablonski diagram or Markov diagram as explained with reference to FIGS. 16-18. In addition, the graphics data include data 124 that represent the average period for which a dye molecule stays in the fluorescent state. The computing device automatically computes the average period for which the dye molecule stays in a fluorescent state. The computing device may determine this period in dependence on transition rates of the molecules, which have been previously computed. The period for which the molecule stays in the fluorescent state may be visualized by the size or brightness of an output symbol, such as the size or brightness of a circle or bar. When the average period for which the molecule stays in a fluorescent state is graphically output, the user is assisted in identifying an exposure time for data acquisition.

The graphical user interface may include a third display area 121 for displaying a value of the exposure time set by the user. The graphical user interface may also include a third adjusting element 122 that allows the user to set the exposure time. The computing device may generate the graphics data 125 such that they also include a graphical representation 123 of the set exposure time. As illustrated in FIG. 19, the data 124 which graphically represents the average period for which the molecule stays in the fluorescent state and the graphical representation 123 of the set exposure time may be generated such that a user can easily compare the two times.

As has been explained with reference to FIGS. 3-19, information on the affects of various adjustable parameters may be output to a user via a graphical user interface. Thereby, the user is provided with information on the importance of various adjustable parameters for data acquisition or data processing. The user is, thereby, assisted in the process of identifying suitable values for the various adjustable parameters, which may be used for data acquisition and/or data processing. As soon as the user has confirmed the set values for the various adjustable parameters, the data acquisition and/or data processing may be performed using the values that have been set in a user-defined manner.

Modifications of the embodiments described with reference to the drawings may be implemented in other embodiments. For illustration, graphics data different from the ones illustrated in FIGS. 3-19 and explained with reference thereto may be output in still other embodiments.

In some embodiments, a processing flow may be schematically illustrated based on specific models. A flowchart representation of a processing flow may be generated and output. The flowchart representation may be generated or adapted in dependence on which one of various adjustable parameters a user has selected.

In some embodiments, the various steps of data acquisition or data processing may be visualized using animations.

In other embodiments, one or several terms of a mathematical formula shown in the graphics data may be highlighted in order to explain the importance of an adjustable parameter for various terms of a mathematical formula.

In some embodiments, results of a simulation may be output. For illustration, the operation principle of a filter, such as a cut-off-filter, may be visualized by outputting simulation data.

In some embodiments, characteristics of a dye may be visualized. A user input may include data relating to a dye contained in a sample. Alternatively or additionally, the microscope system may be configured to automatically determine which dye is used in the sample. The spectrum of optical signals used for a switching or exciting the dye molecules may be shown graphically, thereby assisting the user in identifying a suitable setting for a switching and excitation signal in dependence on the characteristics of the dye. When a wavelength has been selected, information on a dye that would be suitable for use with this wavelength may be output.

As explained with reference to FIGS. 16-19, information may be output as graphics data which illustrate the influence of different switching or excitation wavelengths used in a PALM procedure. Graphics data may also be output, which data illustrate the influence of the power of a switching or excitation signal for the dye that is used in the sample. The computing device may compute transition rates and may graphically visualize the computed transition rates by outputting a Jablonski diagram, a Markov diagram, or another graphical representation. The diagram may be computed as a function of laser power, of the wavelength of the switching signal, and of characteristics of the dye. Alternatively or additionally, information on photo-bleaching or photo damage of the sample may be output.

In some embodiments, the affect of a change in the value set for an adjustable parameter may be visualized by performing a simulation using captured raw data. A preview image may be generated which may be output over the graphical user interface.

In some embodiments, a data processing procedure that includes plural steps may be documented such that intermediate results of the data processing are stored in the form of image data. To this end, various versions of the image data may be graphically presented. The different versions may be versions that result after the raw data have been processed with different numbers of steps of the data processing procedure. Thereby, a protocol of the data processing is realized. The protocol may be generated using raw data that have actually been captured. Alternatively, exemplary data stored in a library or in a storage medium of the computing device may be used as input data for establishing this protocol.

In each one of the various embodiments described herein, the graphics data may be output at the microscope system while the user sets values for the various adjustable parameters. This helps the user in planning data acquisition or data processing.

The outputting of graphics data may be repeated in a time-sequential manner for each one of the various embodiments described herein. For illustration, graphics data associated with a first adjustable parameter may first be output. Later, graphics data associated with a second adjustable parameter may be output, etc. The user is, thus, provided with information on the importance of various adjustable parameters for the procedure that underlies data acquisition or data processing.

While exemplary embodiments have been described in the context of PALM or SIM procedures, embodiments of the invention are not limited to such microscopy techniques. Microscope systems and microscopy methods according to embodiments may generally be used for microscopic techniques, in which a plurality of adjustable parameters may be set in a user-defined manner.

While embodiments of the present invention have been described with reference to the foregoing embodiments and in the context of specific microscopy techniques, it will be appreciated that still other embodiments can be made and that many changes may be made in the embodiments illustrated and described herein without departing from the scope of the present invention as defined by the appended claims. Various modifications and alterations will occur to others upon reading and understanding the preceding detailed description. Accordingly, it is to be distinctly understood that the foregoing descriptive matter is to be intended merely as illustrative and not as limiting. As such, it is intended that the subject invention be construed as including all subject modifications and alterations insofar as they come within the spirit and scope of the appended claims and any equivalents thereof.

What is claimed is:

1. A microscope system, comprising:
   a microscope operable to acquire data, said microscope comprising at least one controllable component;
   a computing device operable to at least one of:
      control said at least one controllable component of said microscope during data acquisition; and
      perform data processing of raw data captured by said microscope; and
   an optical output device coupled to said computing device, wherein:
      said microscope and said computing device are operable to perform at least one of said data acquisition and said data processing based on values respectively set for a plurality of adjustable parameters;
      said computing device is operable to selectively output graphics data with said optical output device as a function of an adjustable parameter selected in a user-defined manner from said plurality of adjustable parameters;
      said graphics data:
         is assigned to said adjustable parameter; and
         represents an affect of said adjustable parameter on at least one step of a procedure upon which at least one of said data acquisition and said data processing is based; and
      said computing device is further operable to output said graphics data, wherein said graphics data is assigned respectively to different ones of said adjustable parameters in a time-sequential manner.

2. The microscope system according to claim 1, wherein:
   said microscope is operable to capture, in said data acquisition, a plurality of two-dimensional frames;
   said computing device is operable to compute, in said data processing, image data from the plurality of two-dimensional frames; and
   said computing device is operable to output, via said optical output device, said graphics data for at least one adjustable parameter that affects said data processing, said graphics data representing an affect of said adjustable parameter on a procedure upon which said data processing is based.

3. The microscope system according to claim 1, further comprising:
   an input device coupled to said computing device and operable to receive a user input that sets a value of a given adjustable parameter selected from said plurality of adjustable parameters; and
   said computing device is operable to automatically output graphics data assigned to said given adjustable parameter.

4. The microscope system according to claim 1, wherein said computing device is operable to output said graphics data as a function of a value that has been set for said adjustable parameter.

5. The microscope system according to claim 4, wherein said computing device is operable to output said graphics data further as a function of a value that has been set for another one of said adjustable parameters, said other adjustable parameter being different from said adjustable parameter.

6. The microscope system according to claim 1, wherein said computing device is operable to output said graphics data before at least one of said data acquisition and said data processing is performed.

7. The microscope system according to claim 6, wherein:
said microscope and said computing device are operable to perform at least one of said data acquisition and said data processing using molecules that are one of optically activatable and optically switchable; and
said computing device is operable to:
automatically compute population probabilities of at least one of molecular states and transition rates between molecular states of said molecules; and
output said graphics data such that said graphics data represent an affect of said adjustable parameter on at least one of said population probabilities of said molecular states and said transition rates between said molecular states of said molecules.

8. The microscope system according to claim 7, wherein said computing device is operable to output said graphics data before said data acquisition is performed.

9. A microscope system, comprising:
a microscope operable to acquire data, said microscope comprising at least one controllable component;
a computing device operable to at least one of:
control said at least one controllable component of said microscope during data acquisition; and
perform data processing of raw data captured by said microscope; and
an optical output device coupled to said computing device, wherein:
said microscope and said computing device are operable to perform at least one of said data acquisition and said data processing based on values respectively set for a plurality of adjustable parameters;
said computing device is operable to selectively output graphics data with said optical output device as a function of an adjustable parameter selected in a user-defined manner from said plurality of adjustable parameters;
said graphics data:
is assigned to said adjustable parameter; and
represents an affect of said adjustable parameter on at least one step of a procedure upon which at least one of said data acquisition and said data processing is based; and
wherein said computing device is operable to:
output said graphics data after said data acquisition has been performed; and
output, via said optical output device, further graphical information in addition to said graphics data assigned to said adjustable parameter, said further graphical information:
being different from said graphics data assigned to said adjustable parameter; and
being generated in dependence on said raw data captured by said microscope in said data acquisition.

10. A microscope system, comprising:
a microscope operable to acquire data, said microscope comprising at least one controllable component;
a computing device operable to at least one of:
control said at least one controllable component of said microscope during data acquisition; and
perform data processing of raw data captured by said microscope;
an optical output device coupled to said computing device, wherein:
said microscope and said computing device are operable to perform at least one of said data acquisition and said data processing based on values respectively set for a plurality of adjustable parameters;
said computing device is operable to selectively output graphics data with said optical output device as a function of an adjustable parameter selected in a user-defined manner from said plurality of adjustable parameters; and
said graphics data:
is assigned to said adjustable parameter; and
represents an affect of said adjustable parameter on at least one step of a procedure upon which at least one of said data acquisition and said data processing is based; and
wherein:
said microscope is operable to perform said data acquisition using a structured illumination; and
at least one of said plurality of adjustable parameters that is selectable for outputting said graphics data is selected from a group comprising:
a periodicity of an illumination pattern;
a number of different orientations of said illumination pattern; and
a filter function for filtering said raw data captured by said microscope.

11. A microscope system, comprising:
a microscope operable to acquire data, said microscope comprising at least one controllable component;
a computing device operable to at least one of:
control said at least one controllable component of said microscope during data acquisition; and
perform data processing of raw data captured by said microscope;
an optical output device coupled to said computing device, wherein:
said microscope and said computing device are operable to perform at least one of said data acquisition and said data processing based on values respectively set for a plurality of adjustable parameters;
said computing device is operable to selectively output graphics data with said optical output device as a function of an adjustable parameter selected in a user-defined manner from said plurality of adjustable parameters; and
said graphics data:
is assigned to said adjustable parameter; and
represents an affect of said adjustable parameter on at least one step of a procedure upon which at least one of said data acquisition and said data processing is based; and
wherein:
said microscope and said computing device are operable to perform at least one of said data acquisition and said data processing using molecules that are one of optically activatable and optically switchable; and
at least one of said plurality of adjustable parameters that is selectable for outputting said graphics data is selected from a group comprising:
a mask size for a fitting step;
a spectrum of a switching signal for switching said molecules;
an intensity of a switching signal for switching said molecules;
a spectrum of an activation signal for activating said molecules; and an intensity of an activation signal for activating said molecules.

12. A microscope system, comprising:
a microscope operable to acquire data, said microscope comprising at least one controllable component;
a computing device operable to at least one of:
control said at least one controllable component of said microscope during data acquisition; and
perform data processing of raw data captured by said microscope;
an optical output device coupled to said computing device,
wherein:
said microscope and said computing device are operable to perform at least one of said data acquisition and said data processing based on values respectively set for a plurality of adjustable parameters;
said computing device is operable to selectively output graphics data with said optical output device as a function of an adjustable parameter selected in a user-defined manner from said plurality of adjustable parameters; and
said graphics data:
is assigned to said adjustable parameter; and
represents an affect of said adjustable parameter on at least one step of a procedure upon which at least one of said data acquisition and said data processing is based; and
wherein:
said microscope and said computing device are operable to perform at least one of said data acquisition and said data processing using molecules that are one of optically activatable and optically switchable; and
said microscope is operable to perform said data acquisition for plural object planes, said plural object planes being spaced from each other.

13. The microscope system according to claim 12, wherein:
said microscope is controllable to adjust a position of said object planes; and
said computing device is operable to output said graphics data that represent an affect of said positions of said object planes on at least one of a size of a measurement area and a resolution that can be attained.

14. A microscopy method, comprising:
capturing raw data and processing said captured raw data in a procedure that includes a plurality of steps, at least one of said capturing of said raw data and said processing of said captured raw data being performed as a function of values set for a plurality of adjustable parameters;
selectively outputting graphics data via an optical output device as a function of an adjustable parameter, said adjustable parameter being selected in a user-defined manner from said plurality of adjustable parameters, said output graphics data being assigned to said selected adjustable parameter and representing an affect of said adjustable parameter on at least one step of said procedure upon which at least one of said capturing of said raw data and said processing of said captured raw data is based; and
assigning said graphics data respectively to different ones of said adjustable parameters in a time-sequential manner.

15. A microscopy method, comprising:
using a microscope system having:
a microscope operable to acquire data, said microscope comprising at least one controllable component;
a computing device operable to at least one of:
control said at least one controllable component of said microscope during data acquisition; and
perform data processing of raw data captured by said microscope;
an optical output device coupled to said computing device,
wherein:
said microscope and said computing device are operable to perform at least one of said data acquisition and said data processing based on values respectively set for a plurality of adjustable parameters;
said computing device is operable to selectively output graphics data with said optical output device as a function of an adjustable parameter selected in a user-defined manner from said plurality of adjustable parameters; and
said graphics data:
is assigned to said adjustable parameter; and
represents an affect of said adjustable parameter on at least one step of a procedure upon which at least one of said data acquisition and said data processing is based;
capturing raw data and processing said captured raw data in a procedure that includes a plurality of steps, at least one of said capturing of said raw data and said processing of said captured raw data being performed as a function of values set for said plurality of adjustable parameters;
selectively outputting graphics data via an optical output device as a function of an adjustable parameter, said adjustable parameter being selected in a user-defined manner from said plurality of adjustable parameters, said output graphics data being assigned to said selected adjustable parameter and representing an affect of said adjustable parameter on at least one step of said procedure upon which at least one of said capturing of said raw data and said processing of said captured raw data is based; and
assigning said graphics data respectively to different ones of said adjustable parameters in a time-sequential manner.

16. Non-transitory storage medium storing instruction code, said instruction code comprising computer-executable instructions that, when executed by a computing device of a microscope system, direct the microscope system to:
capture raw data and process said captured raw data according to a process flow that includes a plurality of steps, at least one of the capturing of said raw data and the processing of said captured raw data being performed as a function of values set for a plurality of adjustable parameters;
receive a user input that selects an adjustable parameter from said plurality of adjustable parameters; and
selectively output graphics data via an optical output device as a function of said adjustable parameter, said output graphics data is assigned to said adjustable parameter and represents an affect of said adjustable parameter on at least one step of said process flow upon which at least one of said capturing of said raw data and said processing of said captured raw data is based,
wherein said output graphics data is assigned respectively to different ones of said adjustable parameters in a time-sequential manner.

17. A microscope system, comprising:
a microscope operable to acquire date, said microscope comprising at least one controllable component;
a computing device operable to at least one of:

control said at least one controllable component of said microscope during data acquisition; and perform data processing of raw data captured by said microscope; and an optical output device coupled to said computing device, wherein:

said microscope and said computing device are operable to perform at least one of said data acquisition and said data processing based on values respectively set for a plurality of adjustable parameters;

said computing device is operable to selectively output graphics data with said optical output device as a function of an adjustable parameter selected in a user-defined manner from said plurality of adjustable parameters;

said graphics data:
is assigned to said adjustable parameter; and
represents an affect of said adjustable parameter on at least one step of a procedure upon which at least one of said data acquisition and said data processing is based; and wherein:
said computing device is operable to output said graphics data as a function of a value that has been set for said adjustable parameter; and
said computing device is operable to output said graphics data further as a function of a value that has been set for another one of said adjustable parameters, wherein said other adjustable parameter is different from said adjustable parameter.

* * * * *